US008032451B2

(12) United States Patent  
Mordecai

(10) Patent No.: US 8,032,451 B2
(45) Date of Patent: Oct. 4, 2011

(54) SYSTEM AND METHOD FOR DYNAMIC PATH- AND STATE-DEPENDENT STOCHASTIC CONTROL ALLOCATION

(76) Inventor: David K. A. Mordecai, Mohegan Lake, NY (US)

( * ) Notice: Subject to any disclaimer, the term of this patent is extended or adjusted under 35 U.S.C. 154(b) by 0 days.

(21) Appl. No.: 13/026,927

(22) Filed: Feb. 14, 2011

(65) Prior Publication Data

US 2011/0137792 A1 Jun. 9, 2011

Related U.S. Application Data

(63) Continuation of application No. 12/035,347, filed on Feb. 21, 2008, now Pat. No. 7,925,581.

(60) Provisional application No. 60/890,861, filed on Feb. 21, 2007.

(51) Int. Cl.
*G06Q 40/00* (2006.01)
(52) U.S. Cl. ............. 705/38; 705/35; 705/36; 705/36 R; 703/23; 463/6
(58) Field of Classification Search ................. 705/35, 705/36, 36 R, 38; 703/23; 463/6
See application file for complete search history.

(56) References Cited

U.S. PATENT DOCUMENTS

| 6,321,212 | B1 * | 11/2001 | Lange ........................ 705/36 R |
| 7,340,433 | B1 | 3/2008 | Kay et al. |
| 7,395,232 | B1 | 7/2008 | Pilato |
| 7,440,909 | B2 | 10/2008 | Puri et al. |
| 7,590,589 | B2 | 9/2009 | Hoffberg |
| 7,693,778 | B2 | 4/2010 | Nafeh |
| 7,774,191 | B2 * | 8/2010 | Berkowitz et al. .............. 703/23 |

| 2001/0027437 | A1 * | 10/2001 | Turbeville et al. .............. 705/38 |
| 2001/0032176 | A1 | 10/2001 | Starkman |
| 2002/0057343 | A1 | 5/2002 | Ronk et al. |
| 2002/0065752 | A1 | 5/2002 | Lewis |
| 2002/0111891 | A1 * | 8/2002 | Hoffman et al. ................ 705/36 |
| 2002/0123951 | A1 | 9/2002 | Olsen et al. |
| 2002/0138416 | A1 | 9/2002 | Lovejoy et al. |

(Continued)

FOREIGN PATENT DOCUMENTS

WO WO 00/16232 3/2000

(Continued)

OTHER PUBLICATIONS

Tuomas W. Sandholm, Leveled Commitment Contracts and Strategic Breach, Games and Economic Behavior, vol. 35, No. 1-2, pp. 212-270, Apr.-May 2001.*

(Continued)

*Primary Examiner* — Shahid Merchant
*Assistant Examiner* — Barbara Amelunxen
(74) *Attorney, Agent, or Firm* — Ostrolenk Faber LLP

(57) ABSTRACT

The invention includes a system and process that employs contractual bargaining with agent-based computational methods for the dynamic allocation, optimization, and pricing of contingent rights and obligations between multiple counterparties with overlapping interests. The processes employ a dynamic and endogenous hierarchy or tiering of binding incentive compatible contingent strategies, which may include optimal liquidation policies for matched assets and liabilities based upon stochastic volume/price schedule related to statistically non-stationary supply/demand elasticities and order-flow, as well as variations in market microstructure. The invention includes a dynamic open system with distributed stochastic control of strategic interactions among dynamic optimizing agents across random states, wherein the actions of any one affects the joint costs and benefits for all the agents.

20 Claims, 11 Drawing Sheets

U.S. PATENT DOCUMENTS

| | | | |
|---|---|---|---|
| 2002/0184142 A1 | 12/2002 | Whang | |
| 2003/0023546 A1 | 1/2003 | Shepherd | |
| 2004/0088245 A1 | 5/2004 | Narayan et al. | |
| 2004/0162772 A1 | 8/2004 | Lewis | |
| 2004/0215551 A1 | 10/2004 | Eder | |
| 2005/0027645 A1* | 2/2005 | Lui et al. | 705/38 |
| 2005/0071266 A1 | 3/2005 | Eder | |
| 2005/0197857 A1 | 9/2005 | Avery | |
| 2005/0216402 A1 | 9/2005 | Dubey et al. | |
| 2005/0222943 A1 | 10/2005 | Monteleone et al. | |
| 2007/0106601 A1 | 5/2007 | Shepherd | |
| 2007/0239577 A1* | 10/2007 | Grody et al. | 705/35 |
| 2007/0265959 A1 | 11/2007 | Hollis et al. | |
| 2007/0294156 A1* | 12/2007 | Hughes et al. | 705/36 R |
| 2008/0126268 A1 | 5/2008 | Sugahara | |
| 2008/0201257 A1 | 8/2008 | Lewis et al. | |
| 2008/0215480 A1 | 9/2008 | Mordecai | |
| 2009/0281891 A1 | 11/2009 | Walker et al. | |
| 2010/0023460 A1* | 1/2010 | Hughes et al. | 705/36 R |
| 2011/0004566 A1* | 1/2011 | Berkowitz et al. | 705/36 R |
| 2011/0081955 A1* | 4/2011 | Lange et al. | 463/6 |

FOREIGN PATENT DOCUMENTS

| | | |
|---|---|---|
| WO | WO 01/50306 | 7/2001 |

OTHER PUBLICATIONS

International Search Report and Written Opinion in International Application No. PCT/US2008/02389.

Ref. U = Gupta et al., Decision Support Systems for Small Business, Journal of Systems Management; Feb. 1989, vol. 40, Issue 2; p. 37.

* cited by examiner

SYSTEM AND METHOD FOR DYNAMIC PATH- AND STATE-DEPENDENT STOCHASTIC CONTROL ALLOCATION

CROSS-REFERENCE TO RELATED APPLICATION

This application is a continuation of U.S. patent application Ser. No. 12/035,347, filed on Feb. 21, 2008 and entitled "SYSTEM AND METHOD FOR DYNAMIC PATH- AND STATE-DEPENDENT STOCHASTIC CONTROL ALLOCATION," which is based on and claims priority to U.S. Provisional Patent Application Ser. No. 60/890,861, filed on Feb. 21, 2007 and entitled "SYSTEM AND METHOD FOR DYNAMIC PATH- AND STATE-DEPENDENT STOCHASTIC CONTROL ALLOCATION," the contents of all of which are incorporated herein by reference.

BACKGROUND

1. Field of the Invention

The present invention relates to transactions, and, more particularly, to mitigating risk and optimizing gain between multiple parties in multiple transactions in involving state-dependent and path-dependent conditions where outcomes maybe jointly interdependent between parties and across transactions.

2. Description of the Related Art

Offsetting risk associated with transactions, particularly involving tangible and intangible assets, is known in the art. Known products in the marketplace include those incorporating asset/liability management and economic capital allocation. Products incorporating these models operate to net and offset multi-lateral financial claims within financial intermediation vehicles and trading environments.

In asset/liability management systems, known applications attempt to match amounts that a party owes (or what that party might owe in the future) to assets and capital that the party owns. Asset/liability management models are employed to strike a balance between, for example, a current value of an asset and its current use, including what the asset is able to generate in terms of current income from its use, and the asset's terminal appreciation or depreciation. Asset/liability management systems evaluate how a party's various states evolve over time, and the effect of those states with respect to cash flow. In a typical borrowing arrangement, a party borrows X dollars, and the party uses the money to purchase Y asset. Use of the Y asset results in Z amount of money being earned. The party uses the Z amount of money earned by using the Y asset to repay the X dollars. In connection with this simple example, asset/liability management systems function to ensure that the Z amount of money is sufficient to pay back the X dollars (plus interest), given fluctuations in value of the Y asset and fluctuations in the current and relative value of X dollars plus interest.

Economic capital allocation systems take into consideration the present values of cash inflows and cash outflows, as determined via asset/liability management models, and further determine the cost of capital in case the borrowing party was to allocate capital, for example, in connection with a first alternative action (A), a second alternative action (B) or a third alternative action (C). Thus, economic capital allocation models estimate possible paths of future cash flows (both in and out) given certain conditions, calculate values of a party's assets versus that party's obligations, and attempt to determine a particular path that maximizes return. In other words, unlike simpler asset/liability management systems, economic capital allocation systems try to ensure that not only are debts are paid by a party, but that the party has maximized his return relative to some level of risk.

Prior art applications, therefore, calculate tradeoffs between an asset's value in a given market and the asset's use or disposition, including credit risk that might give rise to adverse risk-shifting and asset substitution, and require contingent allocation of control rights as a mitigant. Unfortunately, such systems are labor-intensive and involve exposing counterparties to unacceptable amounts of basis and settlement risk. For example, prior art systems fail to effectively parse fundamental asset risks, market risks (price volatility, value at risk, liquidity, interest rates), credit (counterparty default and spread risk), and/or operational risks. Also, prior art solutions fail to effectively disaggregate and recombine dynamically evolving risks, and do not effectively map between state-dependent probabilities, decisions, and values across counterparties. Further, prior art systems fail to adequately account for informational asymmetries, such as private information or unobservable/unverifiable actions, and also costly verification of both states and types, especially where autonomy and anonymity may be necessary, or multiple equilibria (i.e. switching between cooperative and non-cooperative regimes). Such states may result in moral hazard and adverse selection, resulting in holdup, risk-shifting, predation, asset substitution, and other forms of opportunistic wealth expropriation behaviors. Such behaviors tend to proliferate under conditions where costly monitoring/verification and contract imperfection results in incomplete state-spanning by market transactions.

Other shortcomings in the prior art include a failure to adequately account for transactions across parties with multi-attribute valuations/utilities, adaptive utilities, and/or non-stationary statistical processes. Moreover, prior art systems do not adequately address uncertain time horizons and entry/exit of counterparties between the initial and final states (i.e. initial and terminal trade dates) in an open system.

SUMMARY

The systems and methods described herein address these shortcomings by employing contractual bargaining via agent-based computational methods for dynamic allocation, optimization, and pricing contingent obligations between multiple counterparties. The processes preferably employ a hierarchy or tiering of binding incentive compatible contingent strategies which include optimal liquidation policy for matched assets and liabilities based upon stochastic volume/price schedule related to statistically non-stationary supply/demand elasticities and order-flow, as well as variations in market microstructure.

Accordingly, a business method is disclosed for path- and state-dependent, incentive compatible dynamic allocation of asset control rights, depending upon stochastic or random conditions. The processes include matching offsetting state-dependent contingent claims utilizing systematic application of decision theoretic/game theoretic mechanisms.

In one particular embodiment, a system and method for dynamically allocating control rights to offset risks and to optimize net gain or net loss associated with an inventory of at least one of assets and liabilities is provided and used to secure an extension of credit. At least one respective agreement related to the extension of credit to be executed by each of a plurality of counterparties is provided to and executed by each of the counterparties, whereby the counterparties become contractually bound. Further, respective inventory is received from at least some of the counterparties for securing the extension of credit, and the respective inventory is aggregated into an inventory pool.

Continuing with this embodiment, a respective margin amount is charged to each of the at least some of the counterparties, wherein the respective margin amount is proportional to an initial value of each the at least some counterparty's pro rata inventory contribution, and a function derived from state-dependent and path-dependent dynamics governing the value of that contribution over time. Further, the respective margin amount is subject to change over time. The extension of credit is secured with the inventory pool and the control rights to at least some of inventory in the inventory pool are allocated in case at least one respective agreement term is not met by at least one of the counterparties.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DESCRIPTION OF EMBODIMENTS

Figure 1:
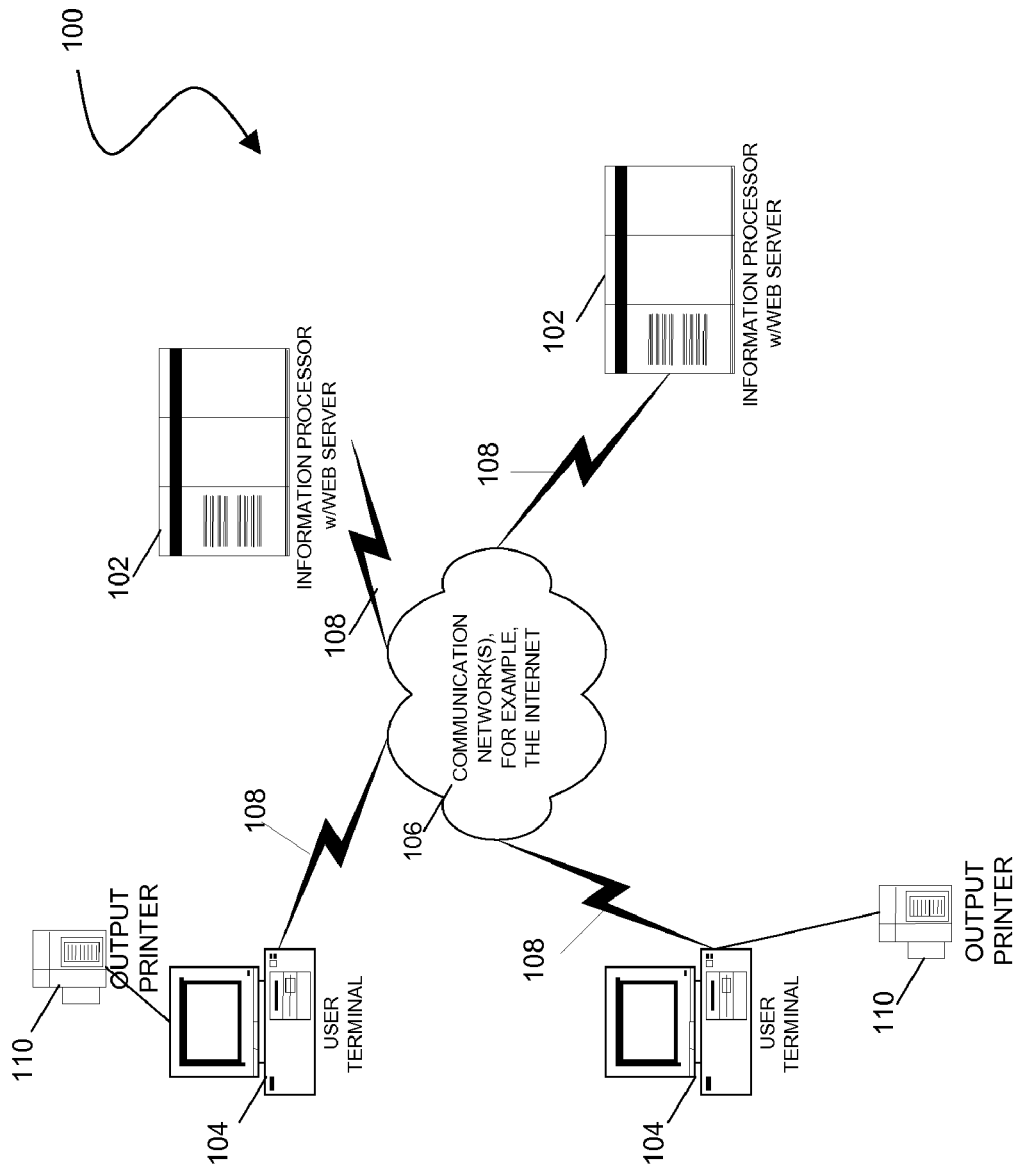
FIG. 1 is a diagram of an example hardware arrangement that operates for control allocation of assets and rights, constructed in accordance with a preferred embodiment.

The present invention relates to multiple transactions across a plurality of parties and operates to mitigate collective risk and optimize collective gain notwithstanding the parties being subjected to state-dependent conditions. This balances individual incentives with collective incentives and encourages parties to participate. In part, this is accomplished by accounting for evolving contractual rights and duties among a plurality of parties by considering decisions and allocation of rights across states and paths. Further, the present invention operates to secure contractual rights, including, by offsetting corresponding payments, across simulated states and paths. Further, the present invention accounts for probable outcomes given activities of other parties to related transactions. In a preferred embodiment, the present invention further supports parties exchanging paths, and regularly and frequently recalculates values and simulates states given a plurality of paths in accordance with the exchanged positions.

Each of the relevant contracts between the transacting parties (commonly referred to as "counterparties" in financial and commercial transactions) is translated into a library of binding contractual rules possessed by each agent. The library is structured to encompass the continuum of all contingencies materially relevant to the transactions between the counterparties' agents. At each date, as each transitional state is realized, each agent may transact on behalf of its respective counterparty, based upon a state-dependent utility function, the path of realized states and simulated paths of future states. In order to maximize individual or collective expected utility, agents may choose either of the following: (A) based upon an opt-out function, at any date, any agent may pay a termination penalty to exit the system. (B) Based upon a path-switching function, any two or more agents may pay a substitution/replacement option premium in order to exchange path histories. These relevant "side payments" (premium or penalty) are deducted from the (endowment, spread reserve, contingent payoff) accounts of those respective agent(s) engaged in opting out or switching paths.

Information may be sent or received via an internet web site comprising a related set of files which are maintained in one or more computer systems (e.g., web servers) and which, when transmitted to a user terminal, cause a user terminal to display and/or execute programmatic operations corresponding to the data contained in the files. Typically, the files comprising the web site are prepared using one or more of a combination of Hyptertext Mark-Up Language (HTML), Extendable Mark-Up Language (XML), Java Applets, ActiveX programs, Standard Generalized Mark-Up Language (SGML) files and the like. Web site files are typically transmitted to a user terminal using one or more protocols, such as the Hyptertext Transfer Protocol (HTTP) under the Transmission Control Protocol/Internet Protocol (TCP/IP) suite of communication protocols.

Also as used herein, browsers refers to an application program residing and executing on a user terminal which functions as an HTTP client, sending requests to web servers for web site files. A request is typically sent in the form of a Uniform Resource Locator (URL) or by selecting a hypertext link presented on the user terminal display. The browser functions to format the file and/or data received from the web server and format the received files and/or data in the manner described therein, displaying the same on the user terminal. Examples of browser programs include MICROSOFT INTERNET EXPLORER and NETSCAPE NAVIGATOR.

As used herein, the term, "module," refers, generally, to one or more discrete components that contribute to the effectiveness of the present invention. Modules can include software elements, including but not limited to functions, algorithms, classes and the like. Modules also include hardware elements, substantially as described below. Modules can operate independently or, alternatively, depend upon one or more other modules in order to function.

Referring now to the drawings figures in which like reference numerals refer to like elements, there is shown in FIG. 1 a diagram of an example hardware arrangement that operates for control allocation of assets and rights, constructed in accordance with the present invention, and designated generally as "control allocation system 100." Control allocation system 100 is preferably comprised of one or more information processors 102 coupled to one or more user terminals 104 across communication network 106. Further, printed output is provided, for example, via output printers 110.

Information processor 102 preferably includes all necessary databases for the present invention. However, it is contemplated that information processor 102 can access any required databases via communication network 106 or any other communication network to which information processor 102 has access. Information processor 102 can communicate devices comprising databases using any known communication method, including a direct serial, parallel, USB interface, or via a local or wide area network.

User terminals 104 communicate with information processors 102 using data connections 108, which are respectively coupled to communication network 106. Communication network 106 can be any communication network, but is typically the Internet or some other global computer network. Data connections 108 can be any known arrangement for accessing communication network 106, such as dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User terminals 104 preferably have the ability to send and receive data across communication network 106, and are equipped with web browsers to display the received data on display devices incorporated therewith. By way of example, user terminal 104 may be personal computers such as Intel Pentium-class computers or Apple Macintosh computers, but are not limited to such computers. Other terminals which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106. Of course, one skilled in the art will recognize that wireless devices can communicate with information processors 102 using wireless data communication connections (e.g., WIFI).

In addition to computer-related methods to access the system, parties who are not able to access the control allocation system 100 via a computer or related device can write physical letters, make telephone calls or facsimiles to parties operating in accordance with the present invention. For example, after a letter and/or telephone call is received, data-entry personnel make the necessary entries into control allocation system 100.

According to the present invention, user terminal 104 provides user access to information processor 102 for the purpose of receiving and providing asset, state- and path-related information. The specific functionality provided by control allocation system 100, and in particular information processors 102, is described in detail below.

Control allocation system 100 preferably includes software that performs path and state simulations (described in greater detail herein), calculates asset-related market values, including related to volatility (or other risk) of an asset, generates markets and provides controls giving an opportunity for parties to exchange rights and allocations, and preferably resides on one or more information processors 102. One of the functions performed by information processor 102 is that of operating as a web server and/or a web site host. Information processors 102 typically communicate with communication network 106 across a permanent i.e., unswitched data connection 108. Permanent connectivity ensures that access to information processors 102 is always available.

Figure 2:
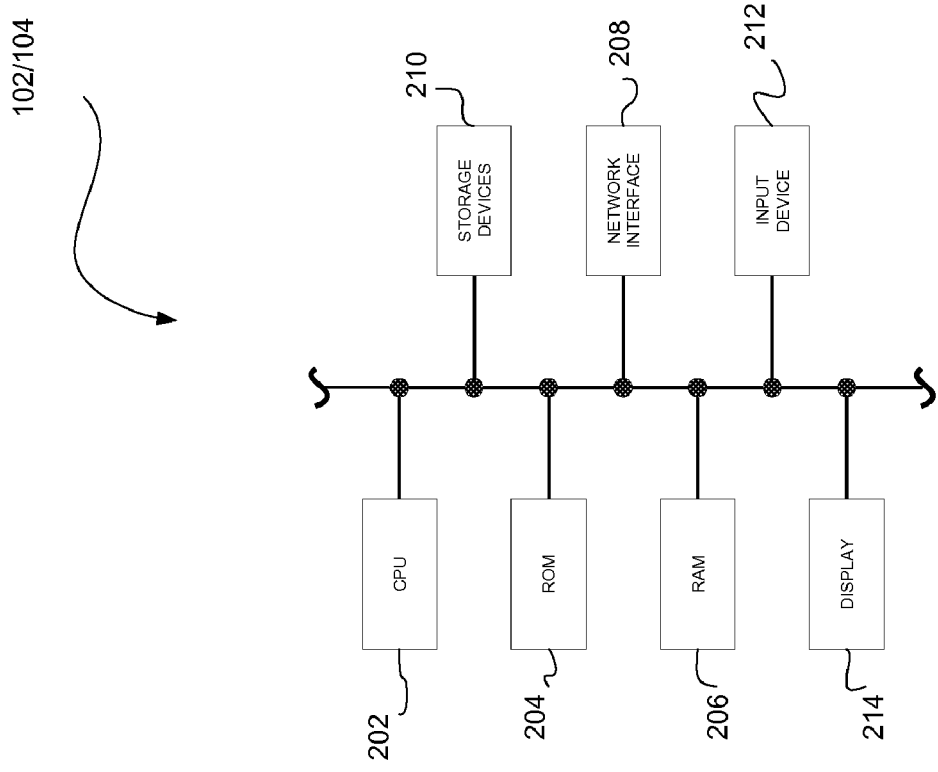
FIG. 2 is a block diagram illustrating functional elements of an information processor or user workstation in accordance with a preferred embodiment.

As shown in FIG. 2 the functional elements of each information processor 102 or workstation 104, and preferably include one or more central processing units (CPU) 202 used to execute software code in order to control the operation of information processor 102, read only memory (ROM) 204, random access memory (RAM) 206, one or more network interfaces 208 to transmit and receive data to and from other computing devices across a communication network, storage devices 210 such as a hard disk drive, floppy disk drive, tape drive, CD-ROM or DVD drive for storing program code, databases and application code, one or more input devices 212 such as a keyboard, mouse, track ball and the like, and a display 214.

The various components of information processor 102 need not be physically contained within the same chassis or even located in a single location. For example, as explained above with respect to databases which can reside on storage device 210, storage device 210 may be located at a site which is remote from the remaining elements of information processors 102, and may even be connected to CPU 202 across communication network 106 via network interface 208.

The functional elements shown in FIG. 2 (designated by reference numbers 202-214) are preferably the same categories of functional elements preferably present in user terminal 104. However, not all elements need be present, for example, storage devices in the case of PDAs, and the capacities of the various elements are arranged to accommodate expected user demand. For example, CPU 202 in user terminal 104 may be of a smaller capacity than CPU 202 as present in information processor 102. Similarly, it is likely that information processor 102 will include storage devices 210 of a much higher capacity than storage devices 210 present in work station 104. Of course, one of ordinary skill in the art will understand that the capacities of the functional elements can be adjusted as needed.

The nature of the present invention is such that one skilled in the art of writing computer executed code (software) can implement the described functions using one or more or a combination of a popular computer programming language including but not limited to C++, VISUAL BASIC, JAVA, ACTIVEX, HTML, XML, ASP, SOAP, and web application development environments.

As used herein, references to displaying data on user terminal 104 refer to the process of communicating data to the terminal across communication network 106 and processing the data such that the data can be viewed on the user terminal 104 display 214 using a web browser or the like. The display screens on user terminal 104 present areas within control allocation system 100 such that a user can proceed from area to area within the control allocation system 100 by selecting a desired link. Therefore, each user's experience with control allocation system 100 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of control allocation system 100.

Although the present invention is described by way of example herein in terms of a web-based system using web browsers and a web site server (information processor 102), control allocation system 100 is not limited to that particular configuration. It is contemplated that control allocation system 100 can be arranged such that user terminal 104 can communicate with, and display data received from, information processor 102 using any known communication and display method, for example, using a non-Internet browser Windows viewer coupled with a local area network protocol such as the Internetwork Packet Exchange (IPX). It is further contemplated that any suitable operating system can be used on user terminal 104, for example, WINDOWS 3.X, WINDOWS 95, WINDOWS 98, WINDOWS 2000, WINDOWS CE, WINDOWS NT, WINDOWS XP, WINDOWS VISTA, LINUX and any suitable PDA or palm computer operating system.

Figure 3:
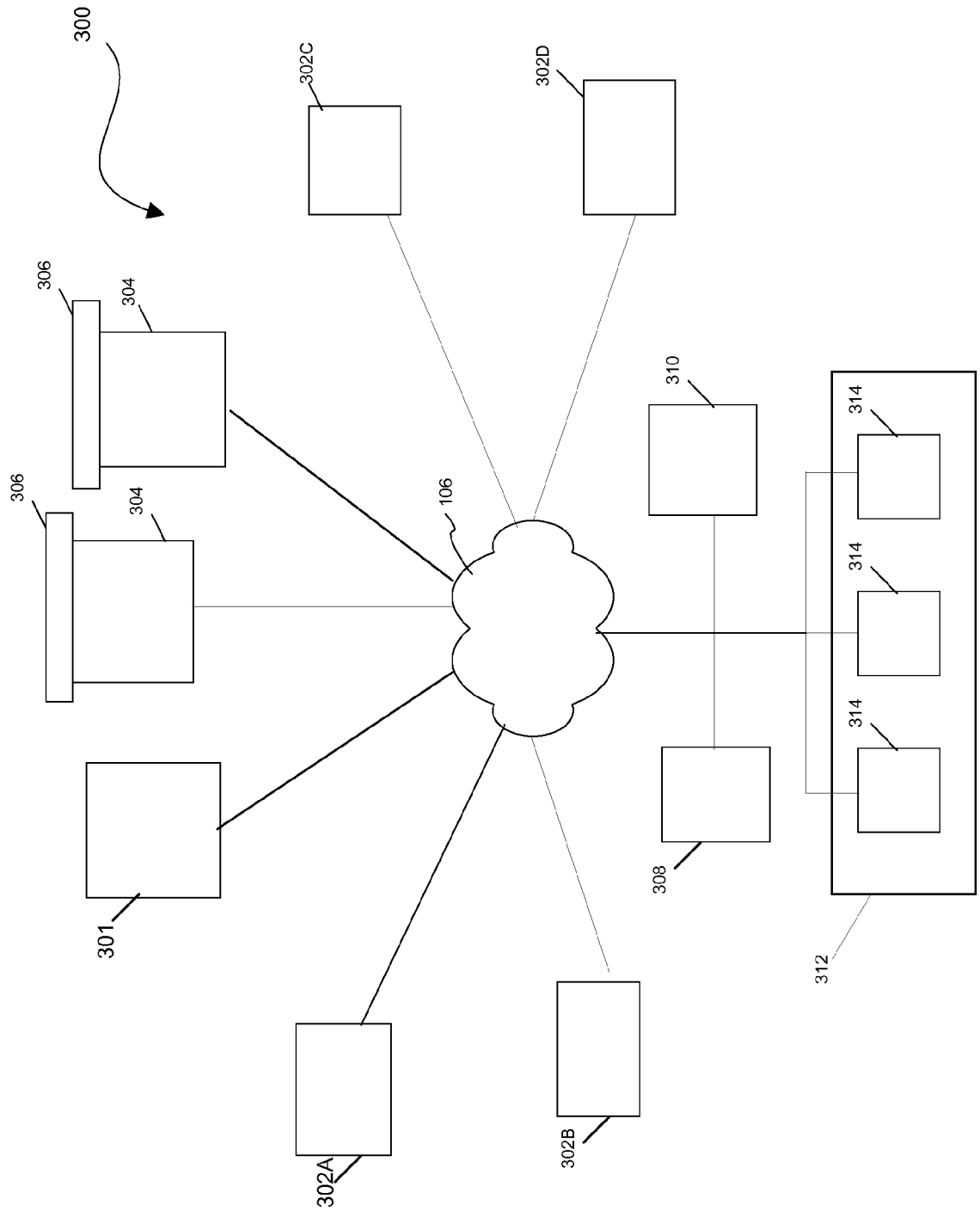
FIG. 3 shows a block diagram arrangement of parties associated together in accordance with a preferred embodiment.

FIG. 3 shows a block diagram arrangement 300 of parties associated together in accordance with a preferred embodiment of the present invention. In one embodiment, a proprietor 301 is one or more parties who provide the present invention, including to control the many features set forth herein, in order to enable the parties illustrated in FIG. 3 to enter into contractual and binding agreements with each other. In one context, proprietor 301 may control information processor 102 in order to provide access to computer-related data entry display screens, output reports, and analysis, such as described in greater detail below. In a preferred embodiment, assets are pledged by counterparties 302 (302A-302D, FIG. 3) to capital funders 304, via funding agents 306 in exchange for capital. Funding agents 306 are preferably configured as software applications, but may take other forms, including as representatives of a funder 304, and operable to process financial payments, such as by interfacing with financial institutions or the like. Preferably, however, agents 306 are automated processes and/or computer software applications.

Moreover, although many of the drawings and examples set forth herein refer to counterparties 302 and funders 304 as separate and distinct parties, the invention is not so limited. In various contexts, funders are counterparties to contractual and/or financial arrangements. Further, given a particular context that is associated with a contractual and/or financial arrangement, borrowers of capital can evolve into lenders and back to borrowers over time (e.g., by extending credit) and in connection with various parties. Accordingly, use of reference numerals, including 302 and 304 that represent counterparties and funders, respectively, is intended for purposes of illustration and not meant to limit the invention by imposing strict contextual relationships. Moreover, and as known in the art (and occasionally used herein) and particularly with respect to one aspect of the present invention regarding term repurchase agreements, counterparties 302 that pledge collateral assets to secure a loan are referred to as "sellers." Therefore, and as recognized by one skilled in the art, various nomenclature for identifying parties changes with respect to the relative relationships of the parties to each other, as well as with respect to the relative contexts of financial, contractual or other arrangements and agreements between the parties.

In addition to providing collateral assets to secure a loan with funders 304, counterparties 302 preferably tender a payment, referred to herein as a "margin" to funders 304. The margin amount is a deposit made by counterparties 302 to funders 304 and represents a percentage of a calculated value of the pledged collateral. In accordance with a preferred embodiment, collateral is valued regularly and preferably frequently, for example, daily. In one embodiment, brokers/dealers 308 perform services associated with valuing and/or disposing (e.g., liquidating) collateral in the market 312. In one embodiment, verifiers 310 are employed to ensure that brokers/dealers 308 operate as instructed and/or to ensure that collateral is fairly valued by brokers/dealers 308. Further, margins are preferably charged to each counterparty 302 and calculated regularly and frequently. Margins are preferably calculated as a function of the value of collateral, and the relative volatility (or other risk) of collateral.

Figure 4:
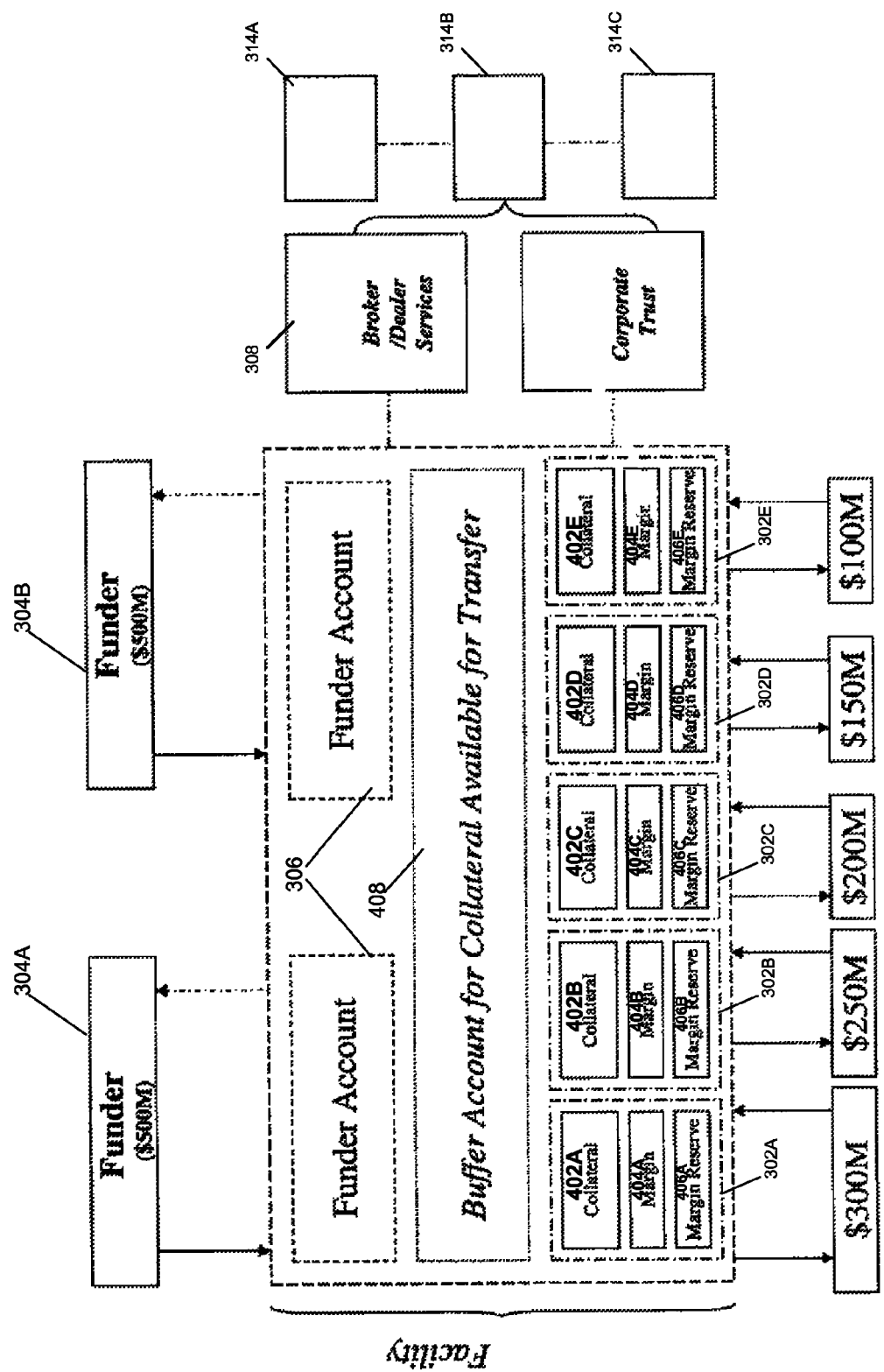
FIG. 4 is a block diagram that illustrates parties, assets and capital in accordance with an embodiment.

FIG. 4 is a block diagram that illustrates parties, assets and capital in accordance with an embodiment of the present invention. The embodiment shown in FIG. 4 represents a repurchasing arrangement, wherein counterparties 302A, 302B, 302C, 302D and 302E pledge collateral 402A, 402B, 402C, 402D and 402E to funders 304A, 304B, pay a respective margin 404A, 404B, 404C, 404D and 404E and maintain margin reserves 406A, 406B, 406C, 406D and 406E, which may require additional payments over time, as described herein. Moreover, a buffer account 408 is preferably maintained for collateral 402A, 402B, 402C, 402D and 402E that is available for transfer, such as by disposal by broker/dealers 308 to buyers 314A, 314B and 314C. In the example shown in FIG. 4, counterparty 302A has pledged the most collateral 402A, valued at $300 M, while counterparty 302E has pledged the least, valued at $100 M. Accordingly, counterparty 302A has paid the highest margin 404A, and, depending upon various market movements and other conditions, may have to add to his margin reserve over time.

In one embodiment, after a period of time as agreed upon by the parties 300, counterparties 302 preferably settle their commitments, for example by purchasing back their assets and to pay funders 304 back. Once collateral 402 is pledged and during the term of loan or other agreement, potential buyers 314 of collateral 402 may offer bid prices that are lower than the value(s) of collateral 402 when originally pledged, or lower than the amount of money for which counterparties 302 originally agreed to repurchase collateral 402. In case broker/dealer 308 determines a lower value for collateral 402, then one or more counterparties may be required to increase their respective margins. In one preferred embodiment, that amount equals the initial amount counterparty 302 promised to purchase collateral 402 minus the currently valued price of collateral 402 minus the current margin reserve. When a newly calculated margin 404 is presented to a counterparty 302 and an amount required for the counterparty to contribute to its respective margin 404, counterparty 302 decides upon a course of action to take with respect to collateral 402. For example, counterparty 302 may decide not to contribute any additional capital to its margin reserve 406 for various reasons. In this scenario, counterparty's 302 collateral 402 may be disposed by broker/dealer 308. Presumably, collateral 402 is sold for a lower amount than its value when originally pledged, and therefore a loss is realized and counterparty 302 incurs a debt. Alternatively, counterparty 302 may elect to contribute the amount to the margin reserve 406. In still another alternative, counterparty 302 may settle with funder 304 by paying for its respective collateral 402 and ending the its involvement in system 100.

Preferably, various models are employed that support a plurality of funders 304 and a plurality of counterparties 302. Notwithstanding counterparties 302 treated by funders 304 as a single group, particularly for purposes of valuing collateral 402, each individual respective counterparty 302 is responsible for its respective individual contribution to the pool. For example, multiple counterparties 302 together pledge a pool of collateral 402 and, similarly, counterparties pledge a margin pool to funders 304. Counterparty 302A pledges $300 M worth of collateral 402 and counterparty 302B pledges $250 M. The collective margin percent is 10%, and counterparty 302A contributes $30 M in cash to its respective margin, while counterparty 302B contributes $25 M.

At various times, including as contractually negotiated between parties 300, one or more counterparties 302 may decide to settle with funders 304 and end their involvement in system 100. Absent any penalty for early termination or other initially negotiated cost, the cost for termination preferably equals the purchase price that counterparty 302 contractually promised to pay for collateral 402 minus the margin pledged by counterparty 302.

In a preferred embodiment, funders 304 track values of pooled collateral by employing inventory liquidators (i.e., brokers/dealers 308). Brokers/dealers 308 preferably generate markets for pooled collateral. Brokers/dealers 308 preferably estimate a value for collateral every day and in the event of some need, brokers/dealers 308 preferably dispose of collateral 402, such as by auctioning collateral 402 to a highest bidder, in connection with a contingency. Preferably, appropriate incentives are provided to prevent broker/dealer 308 from undervaluing collateral 402 and, thereafter, reselling collateral 402 at a mark-up or otherwise acting in its own interests to the detriment of funders 304 or counterparties 302. Thus, incentive compatible situations are preferably contractually agreed upon between parties 300, and provided to prevent low bidding or otherwise to prevent broker/dealer 308 from disposing of collateral 402 below market value.

As noted above and in a preferred embodiment, collateral 402 is regularly revalued, such as on a daily basis, and counterparties 302 and funders 304 are notified of the value of the pool of collateral and of the contributions made by the respective counterparties 302. In case the value of the collateral, including individually pledged collateral 402 or the collective collateral pool, is valued lower than the repurchase amount, then one or more counterparties 302 are notified of the difference with a request to add to one or margins. Each counterparty 302 preferably has an individual and separate contractual arrangement and responsibilities with respect to the entire collateral pool.

In case one counterparty 302 elects not to increase its margin, then its collateral 402 inventory may end up being transferred into a buffer account 408. Once in the buffer account 408, collateral 402 becomes available for sale. Preferably, a counterparty's margin is also transferred into buffer account 408 in case the counterparty's collateral 402 is transferred. Once transferred into buffer account 408, the margin becomes available to support other transactions related to settlement of the loan and/or the disposition of the respective counterparty's collateral 402. In case of disposition and a deficit is incurred, counterparty 302 is preferably issued an "I.O.U." for the debt. Typically, this occurs when there is a bad valuation of collateral 402. In one embodiment, depending upon the terms of the contract between the parties, funders 304 may impose a repayment schedule on a counterparty 302 at a high interest rate. Alternatively, funder 304 may set a value, X dollars, that a counterparty 302 will pay in case a margin is not maintained, or that the counterparty 302 will pay a present value of that ($X) amount at some future time.

In another and preferred embodiment, a counter-scenario regarding allocation of control rights is supported. In addition to tangible assets pledged as collateral 402, intangible assets, such as oil reserves, thirty years of gold forwards, or the like are similarly pledged and actively managed by the systems and methods described herein. In one example scenario, a counterparty pledges a lease on a fleet of ships. Various unknown contingencies, such as freight rates, freight forward rates, spots rates or the like have a residual value rate, which represents the value of the lease over time. In an alternative example, a complete company securitization of cash flows and physical assets can be pledged as collateral 402 in accordance with the teachings herein. For example, a complete so-called vertical chain can be pledged that includes one or more company's cash flows and physical assets. For example, a company may have rights to oil in the ground, and also owns oil storage facilities, oil refinery equipment and oil tanker ships for transporting oil. A sale and leaseback owned by a counterparty 302 and based on an entire company may, accordingly, be pledged in accordance with the teachings herein.

As will be evident to one skilled in the art, allocation of control rights extends beyond disposition of property. Ownership of assets, whether tangible or intangible, can be parsed into residual value of control and rights to cash flows from the residual rights of control. In a preferred embodiment, mechanisms are employed that operate to allocate/reallocate, distribute, weigh and measure respective rights of control of one or more assets pledged by an individual counterparty 302, as well as a pool of assets collectively pledged from counterparties 302, from the gains realized as a function of the control.

In accordance with a preferred embodiment, a right or a contingent right to control of one or more assets can be traded for actual cash flow or a contingent liability. A tradeoff of current cost benefits and regularly or dynamically updated discounted present value of future gains and benefits, depending upon contingent paths and states. In one embodiment, a determination of contingent states and paths is made by employing one or more formulaic strategies, such as known dynamic programming equations or "Bellman" Equations, and/or Nash Equations as known in the art, to calculate the probabilities associated with contingent paths and states, including of counterparties 302, nature, market forces or other random or stochastic events and conditions. Preferably, calculations are performed to identify and/or predict path and state contingencies for a plurality of parties who having different interests over time. The predicted contingencies are preferably used by counterparties 302, funder agents 304, brokers/dealers 308 or others associated with the present invention, in order to calculate values of contingent control rights, current cash flow and a relationship there-between.

As noted above, a counterparty 302 may elect to opt out by, for example, settling with a funder 304 and extracting collateral 402 from the pool of collateral. In such case, the respective counterparty 302 may pay an opt-out fee, and the overall pool of collateral shrinks, accordingly. In such case, it may be that massive repercussions on the remaining collateral in the pool are incurred by removal of the respective collateral 402. The impact may be that overall margin reserve amounts in the pool have changed, requiring that the remaining counterparties 302 have to add more capital to their respective margins. One reason for such repercussions is that the remaining collateral in the collateral pool, i.e., the collateral in the pool that was not removed by the opting out counterparty 302, is more volatile and subject to greater fluctuations in terms of current cost benefits, than collateral 402 that was removed. In such case, a recalculation is performed, for example, via broker/dealer 308, an automated process operating on information processor 102, or the like, and counterparties 302 are notified that an additional outlay to their margins is necessary.

Broker/dealer 308 may have varying kinds and degrees of responsibility, depending upon a particular embodiment implemented by proprietor 301. In case, for example, an automated process operating on information processor 102 calculates probabilities associated with various stochastic paths and states with respect to collateral 402, counterparties, nature, the market, or other forces, broker/dealer 308 may operate as an order taker following receipt of instructions generated on information processor 102. In an alternative embodiment, a verifier 310 is employed to oversee operations of broker/dealer 308. In such an embodiment, broker/dealer 308 may operate merely to take automated orders output, for example, from information processor 102 to sell collateral 402. After collateral 402 is ordered to be disposed of by broker/dealer 308, verifier 310 preferably ensures that collateral 402 is actually disposed of according to the terms set forth in the instructions. Verifier 310 operates, for example, to ensure that broker/dealer 308 does not deviate from a process or that broker/dealer 308 does not attempt to act to its own benefit and to the detriment of others, such as by undervaluing collateral 402, and cutting a side deal with a third party for a profit. Thus in an embodiment, broker/dealer 308 operates as sort of auctioneer by receiving an order to generate a market for collateral 402, and to sell collateral 402 to a highest bidder. Verifier 310 preferably verifies completion of a disposition, and ensures that broker/dealer 308 properly adheres to rules during the disposition process.

In accordance with a preferred embodiment, counterparties 302 typically settle with funders 304 at the completion of a deal. Alternatively and as noted above, in case counterparties 302 elect or otherwise do not increase their respective margins, then respective collateral 402 is disposed.

In accordance with a preferred embodiment, solved across one or more of a series of Bayesian models, Bellman equations and Euler conditions, stochastic views for each respective player (e.g., counterparties 302) can be determined. Moreover, by applying various game theoretic methodologies, such as a Kernel or Core, can be uncovered wherein everyone's optimum meets, thereby ensuring that contractual terms for and between the various parties are provided that will be amenable to all involved. Alternatively, in case one or more terms are not amenable to one or more parties to an agreement, the contractual terms are preferably chosen such that bargaining between the parties is supported for one or more provisions, without departing from the overall spirit and impact of the agreement. Preferably, then, a set of rewards and value functions are provided that relate to decision paths making rules that apply for stochastic conditions, referred to herein, generally, as "stochastic dominance." The rules operate across all (or nearly all) possible states and all (or nearly all) possible decision paths, and are developed to be agreeable to all parties, in order to conform to each party's anticipated respective states and paths.

In one embodiment, the present invention provides for an evolutionary stable equilibrium ("ESS") as a solution method for dynamic and endogenous interdependencies between diverse counterparties 302 over time. For example, counter parties 302 may enter or leave system 200 in accordance with various conditions that occur over time. Complex scenarios involving multiple funders 304, multiple funders 304, and multiple counterparties 302 with respect to a highly diversified pool, of collateral is preferably supported and well managed by the teachings herein. Moreover, the invention supports the complex interrelationships between the parties, and across the tangible and intangible collateral 402 managed thereby. The systems and methods herein manage the various relationships of the parties including as each party's behavior impacts another. Within the complex set of rules and procedures applied to measure stochastic outcomes, each party finds a respective place. Preferably, this occurs as a function of (relatively) simple Nash Equations, as known in the art, thereby employing an analytical approximation to find an evolutionary stable equilibrium. Depending upon a particular embodiment or implementation, for example, by proprietor 301, more complex formulaic approaches may be employed, such as with partial differential equations and finite difference methods to determine a reasonably robust analytic selection that satisfies the group, the thresholds around acceptability among the individual counterparties 302 or the group of counterparties 302.

In case proprietor 301 determines that it is unlikely that such an outcome is likely or even possible using an analytic approach or selection, a more numeric approach is available. For example, the present invention preferably supports Bayesian models in order to continually adapt to and update around conditional probability.

For example, conditional probability and corresponding numeric approaches, such as Bayesian models, are particularly suited for considering and calculating the evolution of each counterparty's respective states and paths of adaptive decisions. Accordingly, the combination is useful for determining what is going to be conditional values of each party's payoff amount (i.e., a settlement amount or a newly calculated margin amount) given a particular state and particular path.

In view of the varying expectations and beliefs with respect to a conditional value of a particular state, the present invention supports a unique flexibility by enabling counterparties 302 to exchange positions or paths, based on their differences of belief, at a particular stage in the process. Preferably, counterparties 302 exchange paths and states as a function of a set of rules that are implemented and agreed to in advance.

In one embodiment, an opt-out function is employed that imposes a termination penalty, such as a fee, on any counterparty 302 that elects to settle with funders 304 in advance of a predetermined date, or in case a counterparty 302 foregoes contributing to its margin, for example, to account for a decrease in the value of that counterparty's 302 collateral 402, and/or in case the value of the pool of collateral has decreased. Preferably, stochastic conditions are predicted as a function of one or more calculations, such as described above, and the parties contractually agree to early termination penalties based on, for example, an entire service of potential paths and states, depending upon a counterparty's 302 history with respect to the process, and based upon the possibilities and how a counterparty's 302 expectation of the future, a counterparty 302 can pay a pre-calculated amount for the opportunity to exchange paths and states with another counterparty 302.

It is recognized by the inventor that the path-switching function supported by the present invention may involve significantly complex arrangements. For example, when two counterparties 302 that own large corporate entities agree to exchange paths and states, the counterparties 302 are actually exchange each other's past, present and future. In case of an equity swap, for example, at least a portion of the transfer price represents the exchange of a company's past and at least a portion represents the exchange of the company's future. By employing the systems and methods described herein, the respective paths and states are more accurately predicted and, further, counterparties 302 explicitly agree to terms for such exchanges as a function of the calculations and the actual paths and states the counterparties 302 have. The present invention supports a more rigorous approach to such exchange than that supported in the prior art, and, accordingly, reduces the likelihood of loss and other shortcomings associated with large corporate transfers.

Further, the systems and methods described herein are particularly useful for counterparties 302 involved in a path-/state-exchange, including related to complex option trades, section 1031 tax deferred exchanges of stock. The invention is further useful for complex exchanges related to durable and intangible portfolios of interdependent assets, such as corporate activity involving power generation, natural resource development, and utilities. Particularly, cost structures going into the future, historical data analysis and based on certain forward looking markets, the present invention can generate contractual terms, including prices, that reflect and take into consideration various states and decision paths of the respective parties. Accordingly, contractual terms preferably change depending upon various conditions.

For example, two companies are considering an exchange. At least one of the companies owns a fleet of ships and has inventory that include bulk carriers, liquid natural gas ships, trampers and liners for oil tankers. The other company has inventory that is comparable in value. The various parties typically have varying interests and intentions. For example, the party receiving the ships may decide to take the corporation in a new direction. Alternatively, the receiving party may intend to stay in the industry, but is going to make a long term be on how demand will evolve, and accordingly, relative values, regarding trampers versus dry bulk carriers, etc.

Thus the present invention supports counterparties that effectively rebalance entire portfolios of assets around a balancing of a company's contingent control rights and contingent rights of disposition. In accordance with the present invention, contingencies and conditions are predicted, such as how the freight rates markets evolve relative to how the salvage markets evolve.

In typical transactions in accordance with the present invention, ongoing contractual relationships are forged and the situations that emerge represent arrangements where compatible and on going investments of money and time. The inventories are preferably tied together by contractual arrangements, are difficult to unravel, difficult to reverse and ensures that one counterparty's 302 activity impacts one or more other counterparties 302.

Although the present invention has been described with reference to a term repurchase agreement that involves pledging collateral 402 to secure a loan and paying back the loan, effectively repurchasing collateral 402, the present invention is not so limited. A discussion regarding an application of search and matching in connection with an alternative embodiment, as well as for supporting various contingencies and addressing impacts parties have on each other as they operate in the marketplace is now provided.

A plurality of retail companies operate in the garment business and are planning for the next season's fashion trends. For purposes of simplicity, only two types of clothing are available for purchase: platform shoes and leisure suits. Further and for purposes of illustration, the only available color options for the leisure suits are lime green or banana yellow. Further, the only material choices for the suits are silk and polyester. With respect to platform shoes, the only materials that are available are anaconda snakeskin or vinyl. The silk suits and anaconda shoes are expensive, while the polyester suits and vinyl shoes are much less so.

Continuing with the present example, at $Time_0$, each company has to decide whether to purchase leisure suits, platform shoes, or some combination thereof. Also, the companies must elect respective styles, colors and materials. None of the parties are able to predict the future and know in advance what will be popular. It may be, for example, that a well-known celebrity influences the market by wearing a silk leisure suit with anaconda snakeskin shoes. The seller who purchases silk suits with anaconda shoes for resale, before that particular combination is in high demand, covers his costs and makes a significant profit. If, on the other hand, that combination is not in demand, then the seller who purchases silk suits and/or anaconda shoes will have huge losses. The seller who purchase polyester suits and/or vinyl shoes will suffer a much lower loss in case that trend is not popular. However, the seller of polyester suits and/or vinyl shoes does not stand to make as much profit because his mark-up is not as high. Therefore, as with virtually all business ventures, there a cost benefit analysis is desirable to offset losses while ensuring profits.

In accordance with the teachings herein, some estimation or prediction of fashion trends is possible. For example, the likelihood of influential parties promoting fashion may be determined. Further, the availability of credit, and hence the ability for consumers to afford the higher priced fashion, can similarly be predicted. Using some of the probability determiners, such as described above, at least a partial determination or prediction of the future can be made.

Continuing with the present example, it may be that consumers only want to purchase packages of suits and shoes, together. In the present example, one seller purchases only lime green silk suits, while another party purchases only vinyl shoes. Therefore, the companies in the marketplace must cooperate with each other to buy and sell their goods to each other and formulate packages of suits with shoes. Alternatively, it may be that orders, when received, were incomplete. For example, only left shoes were received by seller A, and only right shoes were received by seller B.

The present invention preferably requires that contractual rules to be agreed upon by parties, including for side payments, that may be made to exchange inventory. In connection with the above example, those sellers that only received right or left shoes, or that require packages of suits and shoes, must cooperate jointly tie each other to contractual arrangements. Moreover, the relationships and contractual commitments provided in accordance with a preferred embodiment of the present invention preferably require an initial commitment that cannot be entered into in a trivial way, nor can the relationships be reversed easily.

Significantly, the present invention ensures that actions taken, for example, by one counterparty adversely affects other counterparties 302. If too many people dispose of their collateral 402 too quickly, then counterparties may be negatively affected, such as by causing the price of pooled collateral to drop to severely and quickly. Parties have no need, therefore, for prior art inter-creditor agreements or the like that impose checks and balances on parties to prevent certain kinds of behavior. In accordance with the present invention, such provisions or agreements are unnecessary because, as built into the system, counterparties 302 experience pain because of a correlated or shared impact that occurs when one counterparty 302 drops out. As long as individuals pull collateral 402 from a pool slowly, then the overall volatility of the collateral pool is not affected.

In case, for example, one counterparty 302 has contributed the most collateral 402, percentage-wise in terms of volume, value, or both, to a collateral pool, then that counterparty 302 will likely have the highest margin to pay. In other words, counterparty's 302 margin will be a function of both the relative size of his contribution and the relative impact of his contribution in terms of state dynamics (e.g., volatility). In case the counterparty 302 slowly removes his collateral 402, for example, by paying off his debt and without adversely affecting the volatility of the pool or causing a low price impact, then the other counterparties 302 should not be adversely affected. Preferably and in accordance with a preferred embodiment, during a scheduled recalculation of the collateral in the pool, the remaining balance of collateral is calculated and the other parties may have increased margins, or may not. In either case, the remaining counterparties' 302 obligation is pro rata with respect to their respective collateral and their margins, and depending upon the diversifying effect of the one counterparty 302 pulling his collateral 402 from the pool, the remaining parties' margins may change. In other words, the remaining counterparties 302 have a new set of rules where they may have increased margins because of changes in the diversification of the collateral pool. The volatilities, values and correlations between the assets are preferably recalculated, and each party is informed of his respective margin, accordingly.

Moreover and in a preferred embodiment, broker/dealer 308 observes how prices on the individual assets in the collateral pool move together. Each counterparty's 302 margin depends, at least in part, upon the volatility of that respective counterparty's 302 asset. When collateral assets are pooled and the parties are cross collateralizing, the margins are calculated as a function of each counterparty's 302 individual contribution and some component of the correlation of those movements with others. Preferably, the invention is structured to impact the implicit rate that counterparties 302 are charged when they buy back their assets (i.e., pay off their debt), or the invention is structured to impact each counterparty's margin amount, or some combination of the two. For example, a counterparty 302 can be charged a little less on the rate to purchase back his collateral 402 asset(s), and that counterparty pays more into his margin, e.g., for the correlation of his asset in connection with the others in the collateral pool.

Preferably, rules are formulaically established prior to counterparties' 302 commitments, as a function of control variants or decision rules. As described above, control variants preferably account for various contingencies, such as in case a counterparty 302 settles with the funder 304 and pulls out his collateral 402, or in case some event occurs that causes the future to unfold in a particular way. In accordance with the respectively calculated contingencies, various contractual obligations are established, such as to pay into an increased margin. The invention provides that regular and frequent recalculations of the relative values, volatilities and conditions of collateral 402 are performed which may result in new valuations and duties imposed on counterparties 302. Each counterparty 302 preferably commits to abide by rules imposed as a function of simulated states and/or paths calculated, such as described above, using known methods. In accordance with the teachings herein, counterparties may elect to abide by the contractual terms, opt out, or may bargain with another counterparty 302 to switch paths. The other counterparty 302 may have recently experienced a significant state-/path-/change such that a path-/state-exchange looks attractive, even though a margin increase will be imposed when the exchange occurs.

In accordance with an embodiment, counterparties 302 that exchange paths, i.e., positions relative to funders 304, do not necessarily exchange ownership of collateral 402 pledged to funders 304 at the end of the loan or other agreement process. In one embodiment, the exchanging counterparties 302 contractually agree to be responsible for each other's payment and other responsibilities during the term of the agreement. Therefore, as collateral and/or collateral margins are recalculated, each counterparty 302 is responsible for the other's respective payment requirements, as well as to be entitled to the other's various rights, including cash flow rights stemming from the other counterparty's 302 state-dependent residual rights of control. Accordingly, in one embodiment, counterparties 302 do not swap assets, but instead exchange responsibilities and cash flow rights.

Significantly, the present invention accounts for counterparties' 302 respective residual rights of control in connection with assets, including intangible and tangible assets. As used herein residual rights of control refers, generally, to rights to manage assets and corresponding rights to the assets, including rights to income generated by the assets, rights to lease or assign the assets, rights to develop the assets, rights to commercialize the assets, etc. These rights to control the assets are treated differently by counterparties 302 than the rights to capital that is generated by selling the assets. Accordingly, counterparties 302 may have different interests, expectations, goals and intentions with respect to either rights to capital raised by disposing assets versus residual rights to control assets.

The various simulation processes and operations employed in the present invention to predict a plurality of state- and path-related outcomes according to various conditions have an impact for counterparties 302 with respect to each counterparty's residual right of control assets. This is because residual rights of control of assets is state-dependent. Therefore, simulations of a plurality of states directly impact potential residual rights of control.

An example illustrating counterparties' 302 residual rights of control is now provided with regard to the marine hull insurance space. There exists a balancing between various variables, including fuel prices, freight rates and the degree by which assets get used and maintained. Accordingly, the frequency and severity of marine insurance policy claims against policies held by policyholders exist in state-dependent trends. In certain states, policies effectively become a Put of the residual value of a marine vessel to the insurance company. This occurs when, for example, there is high demand for a ship and the ship is extensively used and generating income. In such case when demand for ships is high, fuel prices rise correspondingly. Also, in time when demand for ships is high, policyholders may elect to scale back maintenance, thereby reducing capital outlay associated with maintaining a ship. Also, it may be that policyholders are paying fixed lease amounts, perhaps with some additional, albeit minor, variable amount. Thus and in accordance with one particular state, policyholders enjoy relatively high profits as a function of their residual rights of control, and pay relatively fixed, predictable and relatively low costs. The ships, however, physically deteriorate during the term. At the end of the term, the policyholders claim a total loss and the insurance company is left to pay on their claims.

In the above example, a trade-off arises between the future of value of an asset, i.e., a ship, and the current cash flows generated by the asset. In the previous example, the present value of the lease is significantly higher than the residual value of the ship in the future. Effectively, the policyholders (e.g., the captains of the ships) transfer their respective risks in their assets to the insurance company/companies. A balancing test based on the stochastic states and paths for each policy holder results in a decision to pay higher fuel costs and make high revenues, rather than preserve the value of the asset. This example illustrates a trade-off between residual rights of control of an asset (i.e., what is done with the ship) and the future value of the asset. Insurers and policy holders does not know at time period T what other variables, such as freight rates, are going to be ten years into the future.

In accordance with a preferred embodiment, however, simulations can operate to determine future freight rates and fuel prices given future stochastic states, and policy holders can use that information to balance the relationship between the possible rates and the possible value of the ship at the end, for example, a lease term. In case, for example, an alternative state is simulated, in which freight rates are low, fuel prices are similarly low (due at least in part to low demand) and low income earnings, then decision paths regarding maintenance, operations and preservation of the asset may be very different because while the present value of the asset may be very low, the possible future value of the ship is very high given that at some point in time, states could change. One innovation of the present invention is that simulations and various path/state conditions are simulated for many assets, such as fleets of ships, as opposed to a single asset or one ship.

The level of complexity associated with managing tradeoffs between residual rights of control and future value of many assets, for many parties and given many conditions impacting various states is handled by a series of complex simulations, probability calculations and outcomes. Further, the invention involves tying assets and responsibilities together such that a shared liability and shared benefit among a plurality of counterparties 302 emerges that promotes and precludes various types of behavior. The system and methods described herein are highly representative of the way the world actually operates, thereby providing simulated outcomes given possible conditions and enabling counterparties 302 to agree to contractual terms and duties that will be acceptable and can be adhered to by all, prior to entering into binding agreements.

The example above regarding the marine hull insurance space focuses on policyholders shifting risk to insurance companies. One skilled in the art will recognize that insurers will likely agree to conditions in which policyholders are entitled to transfer all of the risk to the insurer. Using the systems and methods herein (in connection with the above example), insurers and policy holders preferably review contractual terms based on simulated path- and state-dependent outcomes prior to agreeing to terms, and bargain to reach a balancing between duties and benefits that is acceptable to both parties.

Although the present invention has been described largely in terms of minimizing, precluding or avoiding adversity as a function of contractual ties to pooled collateral and contingent rights of control of assets, the invention is not so limited. It is envisioned that collateral and return thereon is preferably optimized in accordance with the teachings herein. For example, counterparties 302 preferably have incentive to contract in accordance with the invention to enjoy benefits of a lowered implicit interest rate as a function of pooled collateral. Although each counterparty's 302 margin is based on the respective collateral 402 pledge, based, for example, on the value of collateral 402 and the volatility of the collateral 402, the diversification of the entire collateral pool advantageously affects the interest rate of the respective counterparty's 302 collateral 402.

Figure 5:
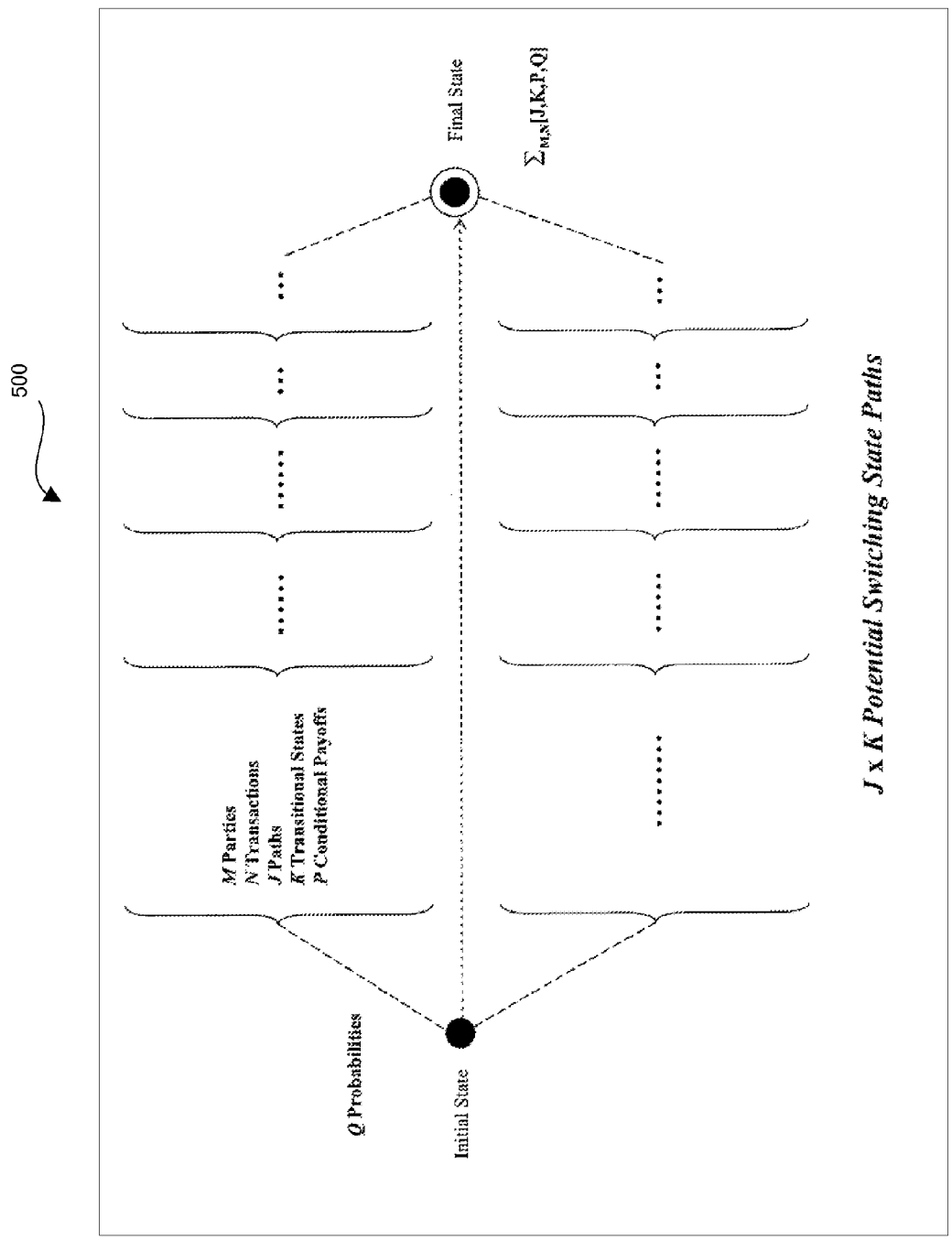
FIG. 5 is a state diagram representing a plurality of parties and a plurality of transactions over time in accordance with an embodiment.

FIG. 5 is a state diagram representing a plurality of parties and a plurality of transactions 500 over time. As shown in FIG. 5, counterparties 302 (shown as "M parties"), with common information I and private information $\emptyset_m$, precommit to transact over the period from date to T, by pledging at $t_0$ their respective capital endowment, $E_0$. All parties observe each state $k_t$, and transact at each date (decision node) in accordance with their utility function and based upon their expectations (computed rationally from I and $\emptyset_m$) regarding the path of future states from $t_n$ to T.

Figure 6:
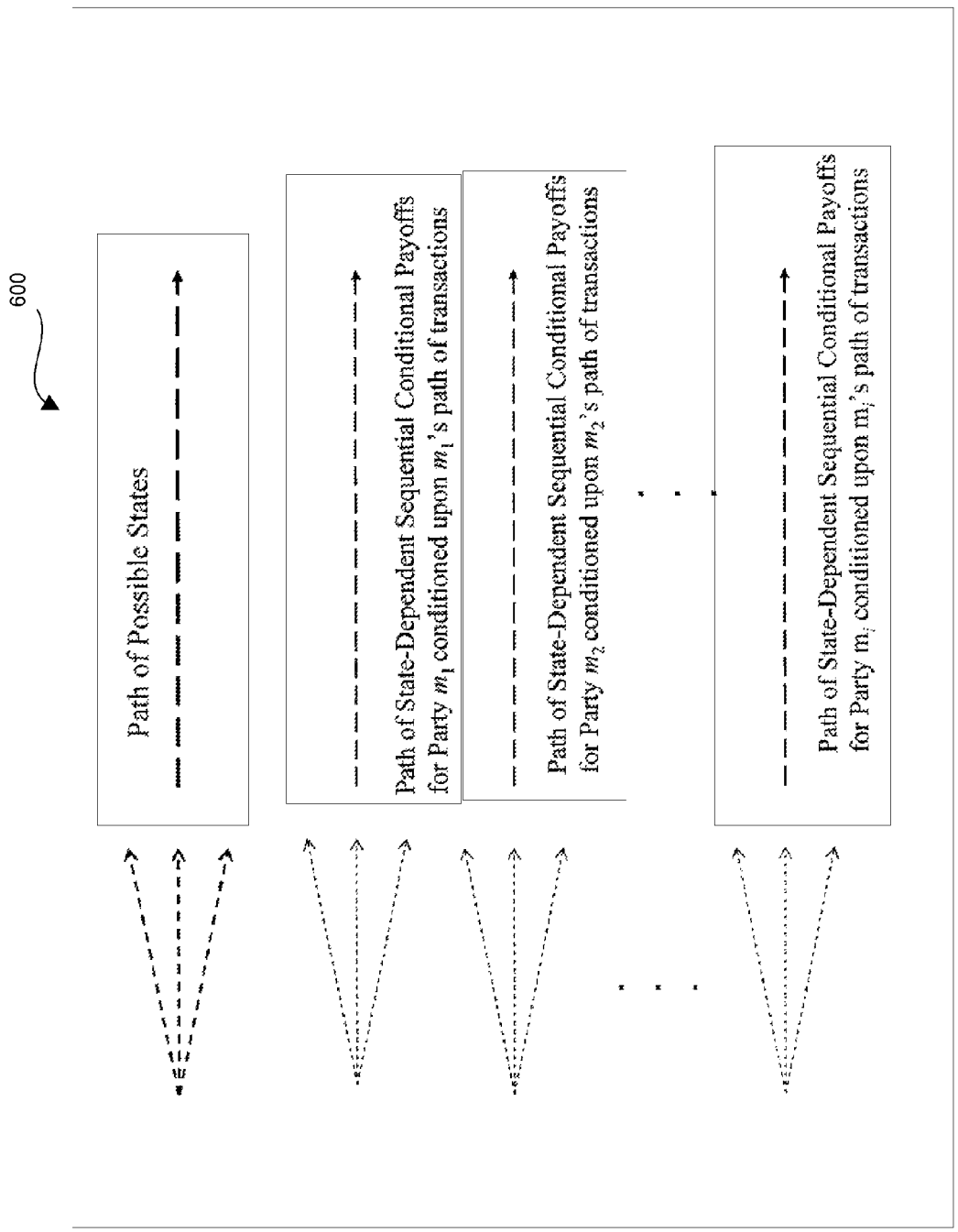
FIG. 6 illustrates conditional payoffs for each party illustrated in FIG. 5 in connection with possible states.

FIG. 6 illustrates conditional payoffs 600 for each counterparty 302 illustrated in FIG. 5 in connection with possible states. For each counterparty 302, each state results in a path $j_m$ of conditional payoffs $p_m$, based upon each party's 302 previous path of transactions. The method enables parties to implement incentive-compatible, optimal strategies for trading paths and cumulative payoffs in the presence of sequential irreversibility of individual paths (i.e. path-dependence) to maximize state-dependent utility across the parties.

Preferably functional component mechanisms are supported, along with devices comprising known processes including, for example, coordination and enforcement mechanism(s), (Bayesian) multiperiod decision models with alternating choice (and adaptive utility), verification mechanisms, inspection devices, general participation constraints, mechanism selection process/criteria, nonlinear multidimensional pricing schemes/functions, contingent decision nodes and option values to reduce dimensionality. Further, the present invention supports side-payment, penalty, and reservation-value functions, such as to address cost-benefit tradeoffs. Moreover, sequential strategy and path-switching functionality via distributed search and bargaining, and dynamic matching is preferably supported. Moreover, the present invention preferably supports messaging, including sender-receiver messages and compact search representations in complex domains (e.g., informational and procedural data compression).

The above-identified components are preferably operatively classified within five fundamental functional groupings:

1) Contracting: the invention preferably supports incentive-compatible pre-commitment, coordination, and enforcement mechanism(s).

2) Observation, verification and validation: the present invention preferably supports monitoring and verification mechanisms, as well as inspection devices.

3) Bargaining: Preferably, general participation constraints and mechanism selection process/criteria are supported by the present invention.

4) Probability/Decision Value/Utility Mapping: Preferably, the present invention supports contingent decision nodes and option values to reduce dimensionality. Further side-payment, penalty, and reservation-value functions, such as to address cost-benefit tradeoffs, are further supported.

5) Matching/Transacting. Preferably, sequential strategy/path-switching functions are supported via distributed searching/bargaining and dynamic matching. Moreover, messaging (i.e., Sender-Receiver) is supported, as are compact search representations in complex domains, such as via informational and procedural data compression). Moreover, phase and state transition functions are preferably supported.

Figure 7:
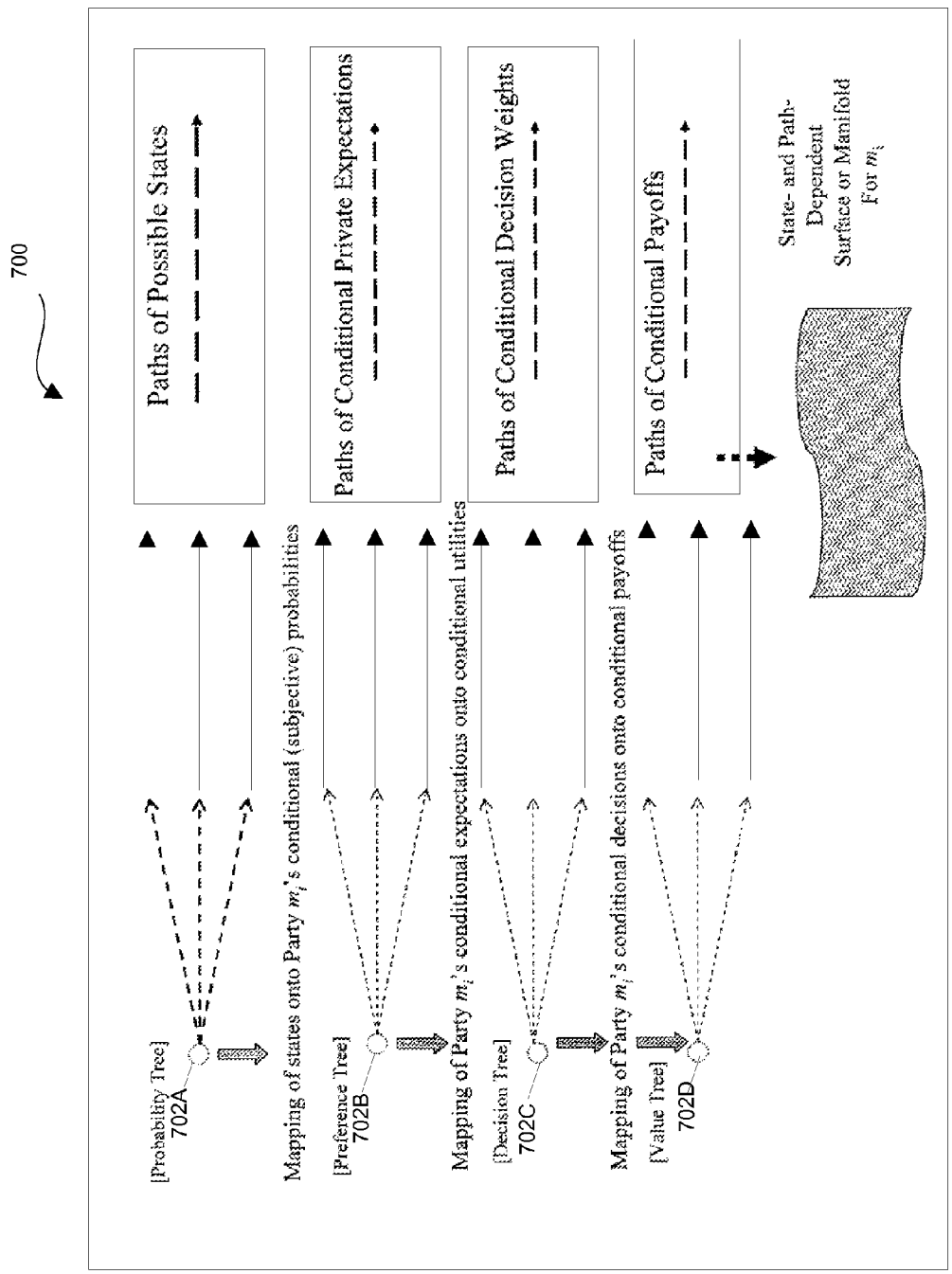
FIG. 7 illustrates functional software agents that employ a variety of functions, mechanisms, and devices.

FIG. 7 illustrates paths 700 associated with functional software agents 702A, 702B, 702C and 702D that operate to employ a variety of functions, mechanisms, and devices. Software agents 702A-702D preferably map objective states to subjective or "conditional" probabilities. Preferably, the conditional joint probability distributions are mapped as conditional expectations onto conditional utilities, which are then mapped onto conditional payoffs. The result is a contingent payoff function, which may be represented as a multi-dimensional surface (i.e. a manifold) comprised of paths of "conditional" state-dependent outcomes. For example, and as shown in FIG. 7, the "conditional" state-dependent outcomes include conditional private expectations, conditional decision weights and payoffs.

Figure 8:
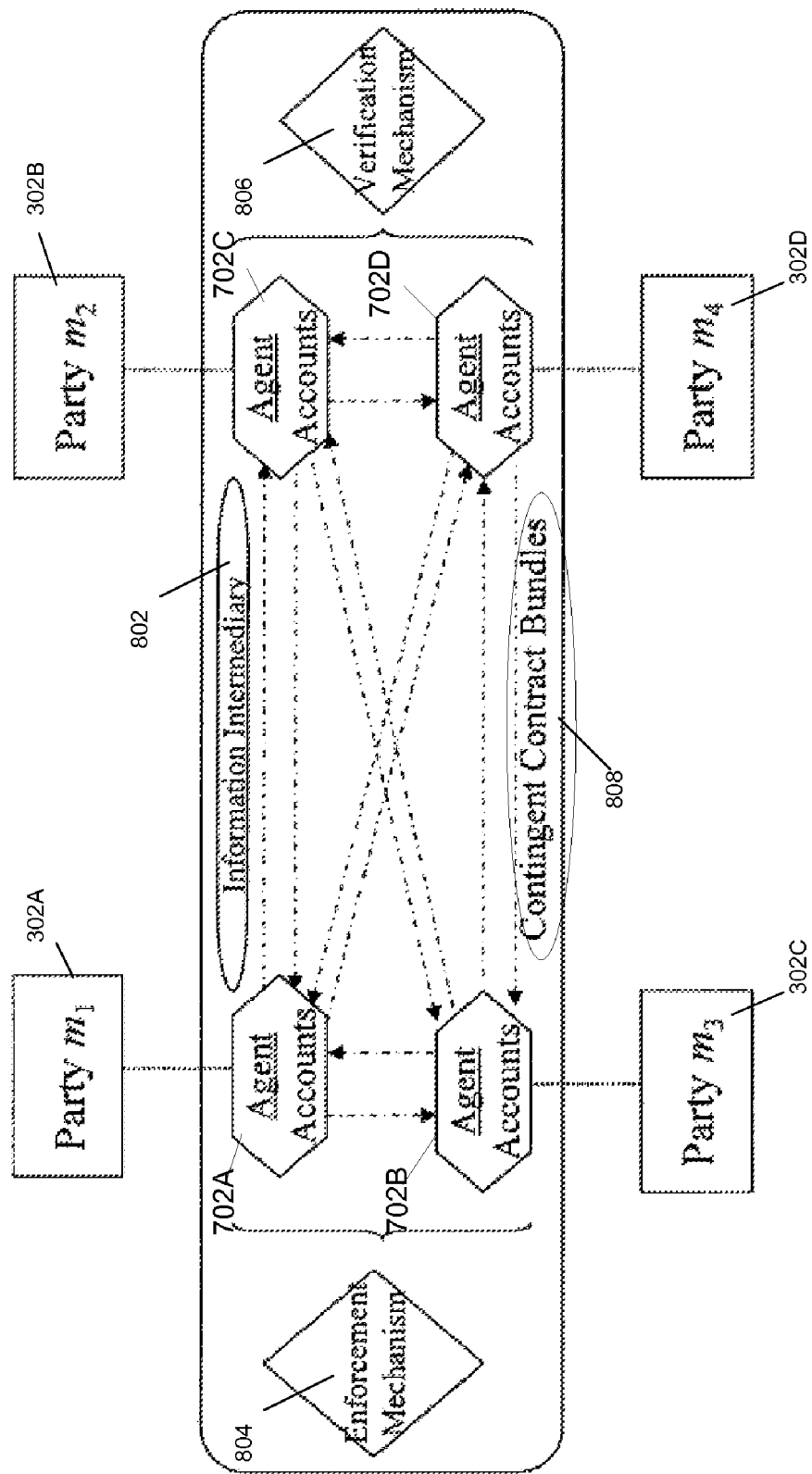
FIG. 8 illustrates software agents transacting on behalf of transacting counterparties, in accordance with a preferred embodiment.

FIG. 8 illustrates agents 702 transacting on behalf of each transacting counterparty 302, in accordance with a preferred embodiment. As shown in FIG. 8, information intermediary 802, enforcement mechanism 804, verification mechanism 806, and contingent contract bundles 808 are provided. Preferably, contingent contract bundles 808 represent bilateral agreements between agents 702 participating in the system/process.

Figure 9:
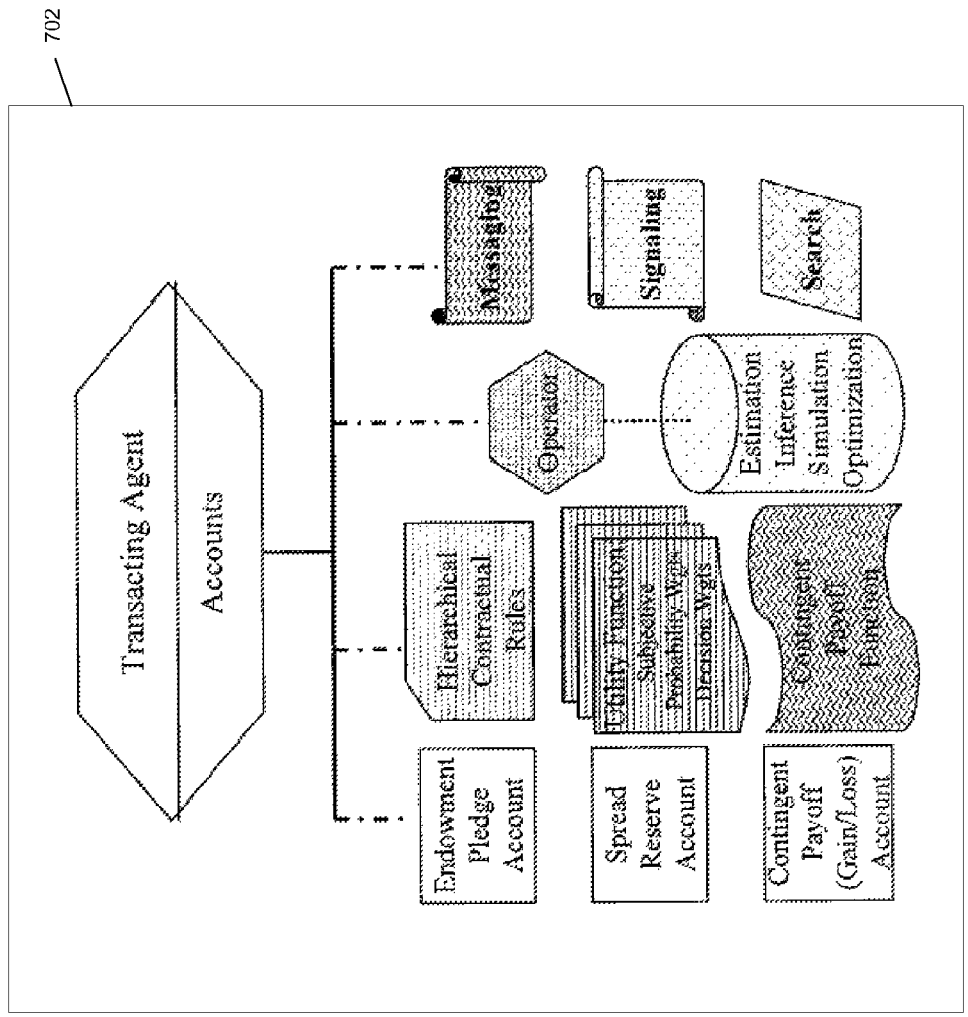
FIG. 9 illustrates component aspects of agents, in accordance with a preferred embodiment.

FIG. 9 illustrates component aspects of agents 702, in accordance with a preferred embodiment. Each agent 702 preferably comprises components for supporting the teachings herein. As shown in FIG. 9, three accounts are provided including an endowment pledge account, a margin reserve, shown in this case as a "spread" reserve, as known in the art), as it accumulates, and a contingent payoff account to support gains or losses in connection with disposition of collateral 402. Further, a library of hierarchical contractual and procedural rules, which are subject to dynamically change and evolve, is preferably analogous to contingent contracts is supported. Moreover, a utility function for determining subjective, probability and decision states (shown as weights or "wgts") is provided. Moreover, a contingent payoff function is preferably provided. Also shown in FIG. 9 is a computing engine that preferably performs estimation, forecasting, inference, simulation and optimization operations. Moreover, messaging is supported, including sender and receiver signaling and messaging. Further, search engine technology is further provided to support searching and matching functionality.

Figure 10:
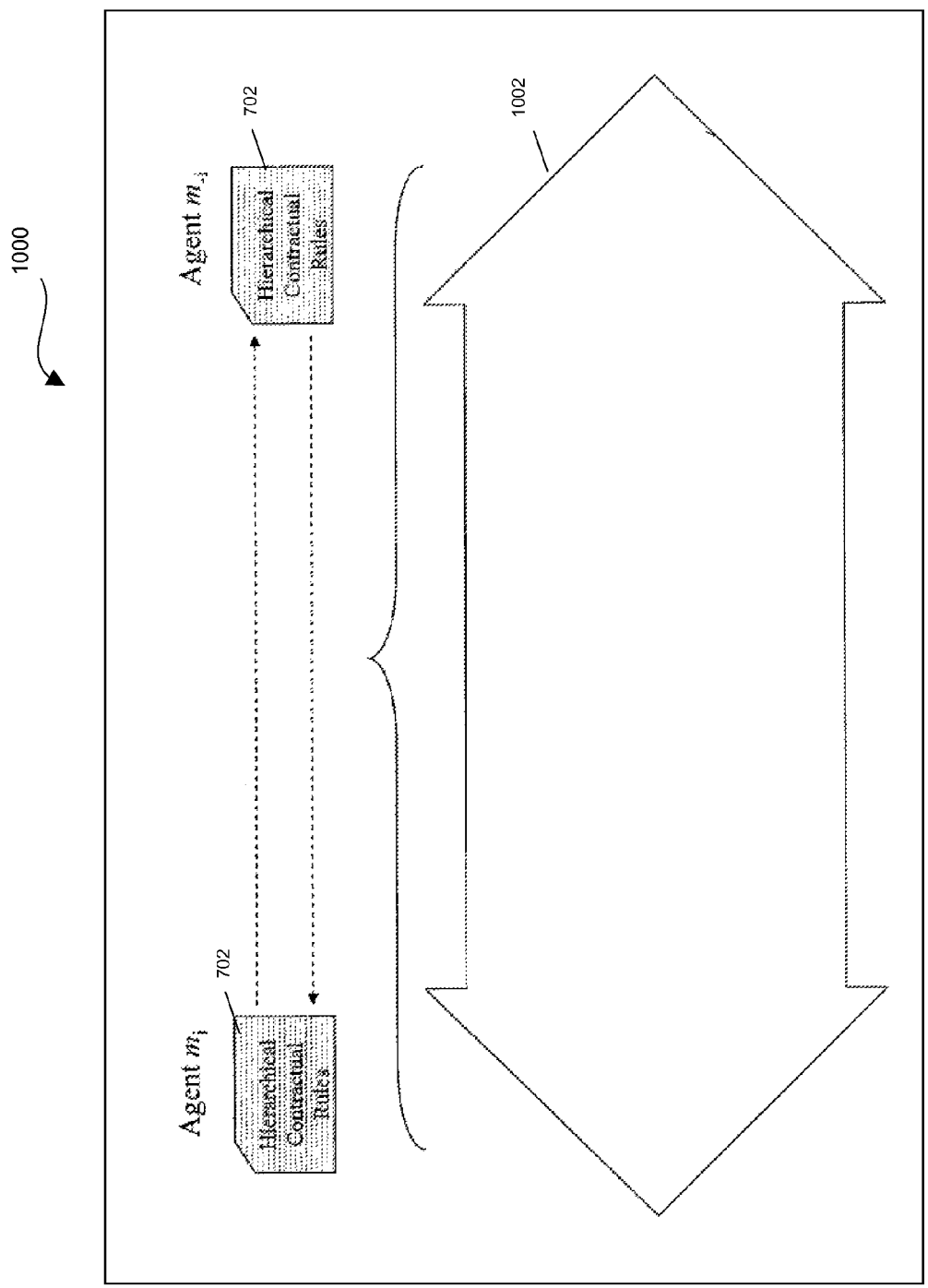
FIG. 10 shows a general list of mechanisms, functions and devices provided in hierarchical contractual rules associated with an agent.

FIG. 10 illustrates an interaction 1000 between two or more agents a general list of mechanisms, functions and devices 1002 provided in hierarchical contractual rules (FIG. 9) associated with an agent 702. The contractual rules preferably comprise a library of hierarchical rules and procedures embedded within each bilateral agreement between any two (or more) transacting counterparties 302 and their respective agents.

In connection with mechanisms, functions and devices are provided in contractual rules associated with each agent. For example, one or more of the following is implemented: coordination and enforcement mechanisms; (credible) signals; correlated equalibria mechanisms: triggers/thresholds; pre-commitment mechanisms and incentive compatibility criteria; reserve requirements (stochastic storage); verification/inspection right rules; general participation constraints; and opt out function. Other functions and mechanisms employable by agents includes mechanism selection criteria: non linear multidimensional pricing schemes/functions (priorities, capacity/intensity); division of surplus (gains/losses) from trades versus transfers of control trade-off functions; side payment, penalty, and reservation value functions (cost-benefit trade-offs); and strategic strategy/path switching option pricing functions.

Examples of transactions, instruments and applications are provided below: complex insurance, hedging, and funding (repo, swaps, etc.) activities. Specialty Finance, Structured Insurance, Alternative Risk Transfer ("ART"), Finite/financial reinsurance and tradeable insurance, Insurance derivatives, Insurance wrapped defeasance account (stable value, Guaranteed Investment Contract or "GIC") with conduit financing, Counterparty credit netting activities/vehicles: (collateralized credits versus debits with credit intermediation, e.g. structured bank liquidity or financial guarantees as capital (operational risk policy, surety, performance bond) to pay as claims come due, Customized risk overlays reference portfolio with derivative instruments overlay, Reference indices, baskets or portfolios that may involve life (mortality/longevity), equity, futures, indices/baskets; Industry Loss Warranty ("ILW"), Catastrophe Risk Swap ("Cat Swap")/option, treaty, indemnity, GIC, etc.

The present invention is also applicable for designing, operating and maintaining (as Complex Adaptive Systems), the any netting arrangement involving multiple counterparties, especially which may involve asset illiquidity, regime shifting of the market environment, and informational asymmetries: Electronic Clearing Networks ("ECN's")/Electronic Trading Markets (e.g., Derivative Exchange Trading Facility or Derivative Electronic Trading Facility ("DETFs") involving insurance, hedging and funding (repo, swaps, contracts-for-synthetics, etc.), credit/trade credit facilities and/or collateral mgmt programs (Business-to-Business ("B2B"), 3PL Third-Party Logistics ("3PL") applications; integrated Straight-Through-Processing, reconciliation/settlement systems); netting arrangements with multiple counterparties for auctions; self-financing risk intermediation vehicles (conduits, swap and repurchase agreement ("repo") netting facilities, derivative product companies, structured investment vehicles, insurance captives and transformers, clearinghouses, etc).

In general, the present invention is applicable to any capital intermediation platform involving bundles of insurance contracts, master/netting arrangements, back to back financial instruments (e.g. swaps, options, repos, futures/forwards, CfDs, etc), Letters of Credit ("LCs" or "LOCs"), guaranties, warranties, receivables, as well as other cash or contingent liabilities. In conjunction with conventional asset/liability management systems and economic capital allocation models for netting and offset of multi-lateral financial claims (i.e. risk-bearing capacity) within financial intermediation/trading environments and structured investment vehicles, the process is intended to more perfectly match sequentially-linked contingent claims and hence more completely span states of nature, thereby substituting more effectively matching contingent claims for paid-in capital, in order to minimize the amount of capital, and the related the cost of maintaining reserves, required to support transactions within these environments. Hence this process also includes a method for imbedding liquidity options into financing structures, applicable to a broad range of multi-lateral contingent capital structures with application to the active management of assets and liabilities for self-financing risk intermediation vehicles and facilities (conduits, SwapCos, etc.).

Figure 11:
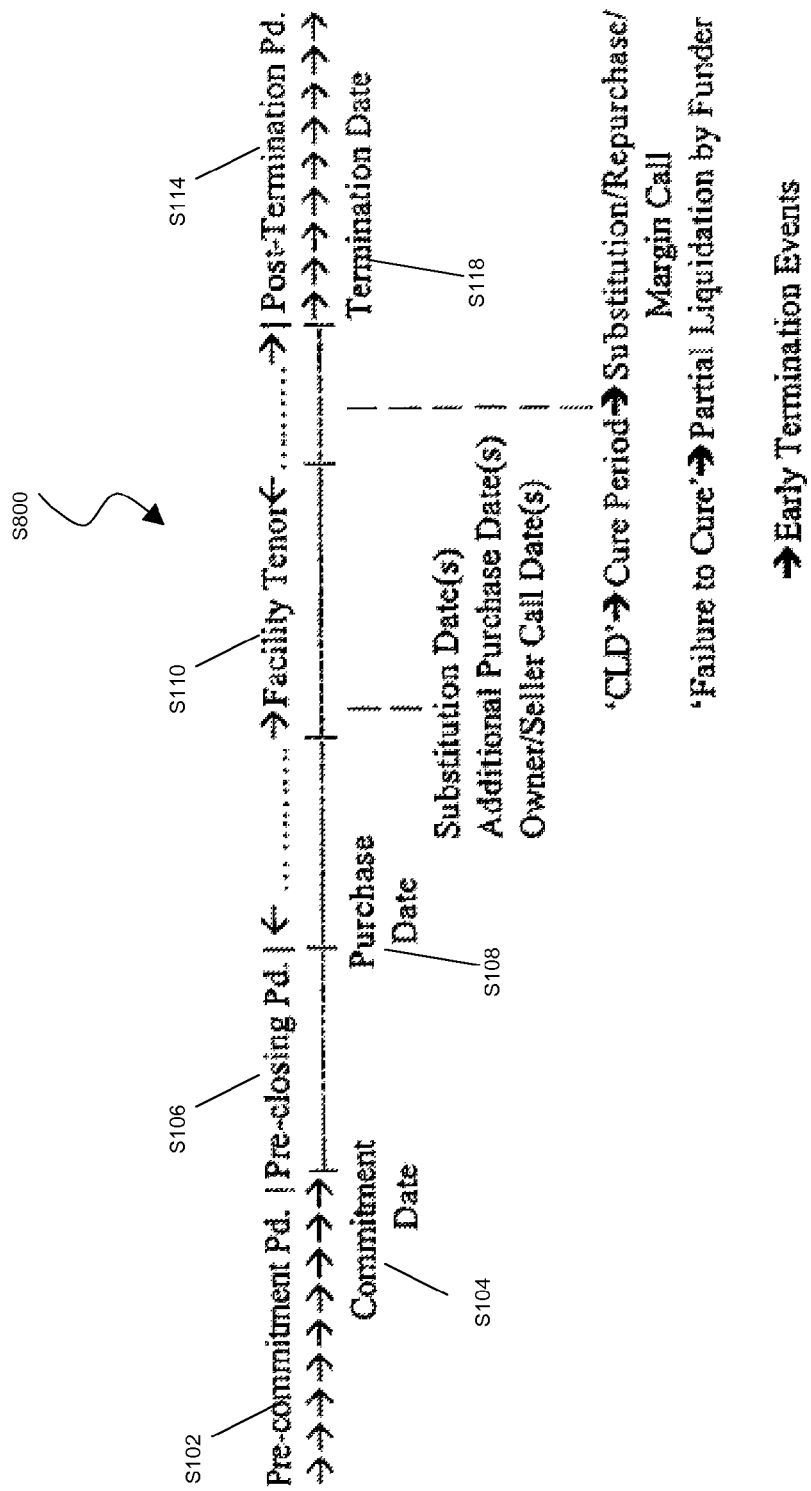
FIG. 11 illustrates a timeline of steps associated with pre-commitment, commitment, pre-closing, purchase, facility tenor, termination and post termination periods, according to a preferred embodiment.

Referring now to FIG. 11, a timeline of steps S100 is described that includes example steps associated with pre-commitment, commitment, pre-closing, purchase, facility tenor, termination and post termination periods.

Step S102: Pre-commitment Period: Generally between ten-fifteen business days: 1. Funders and/or sellers review Global Master Repurchase Agreement ("GMRA"), Custodial Undertaking ("CU") (i.e., a supporting schedule for the GMRA), and Supporting Annexes II, as known in GMRA & I repurchase agreements. 2. Sellers submit pool-cut for model tie-out by conduit managers, collateral agents, funders, and other vendors to the conduits. 3. Conduit manager negotiates eligibility requirements/max. concentrations with funders and/or agencies 4. Conduit Manager negotiates pricing rate/tenor tradeoffs, notification periods, cure periods, termination triggers, and orderly termination/liquidation procedures with Funders. 5. Conduit Manager negotiates pricing, discretionary substitutions, and over-collaterization levels for Sellers' collateral pool. 6. Funders and/or Sellers begin documenting accounts/establishing operating procedures with CA/Custodian Bank (Pre-closing process begins).

Step S104: Commitment Date: Generally one day. 1. Funders execute GMRA, CU, and Supporting Annexes I & II with Owner. 2. Funders' GMRAs, CUs and Supporting Annexes escrowed with Custodian Bank. 3. If commitment is 'pre-funded', Funder transfers funds to respective Funder account for disbursement on Purchase Date, once conditions for closing are satisfied; if commitment is 'unfunded', then Funder transfers funds to respective Funder account on the Purchase Date for disbursement, once conditions for closing are satisfied. (Pre-closing process completed).

Step S106: Closing Date (initial Purchase Date): Generally 1 Day. 1. Funders advance Purchase Price to Custodian, if commitment unfunded. 2. Custodian transfers Purchase Price to Funder's Account. 3. Conduit Manager and verification agent ("VA") tie-out model estimates of OC with Funders and Sellers for Purchased Securities to be transferred to the Collateral Account. 4. Pursuant to instructions of paying agent ("PA") under collateral administration agreement ("CAA"), Custodian disburses funds from Funder's Account as advance to fund Purchase Price of Purchased Securities in Collateral Account. 5. VA verifies reconciliation of eligible collateral transfers/fund flows/payments and margin compliance based on activity report provided by Paying Agent, Custodian, and CAA. 6. Counsel affirms validity of required opinions (enforceability, security opinion, tax). 7. Conduit Manager reaffirms VA reconciliation of collateral transfers/fund flows/payments and margin compliance based on activity report provided by Paying Agent, Custodian, and CAA.

Step S108: Funding Period (Stated Tenor of Facility): Generally greater than or equal to ninety days. 1. At the end of each business day, CA calculates the daily market value of Collateral Account, based on prior business day's end-of-day closing price from the pricing source for each Purchased Security in Collateral Account and adjusts the Daily Collateral Levels to conform to the Collateralization Tests, by transferring Cash Equivalents between the Margin Accounts and Margin Reserve Accounts. 2. Conduit Manager affirms the validity of the Daily Collateral Level Adjustments, and in the event of a pricing disparity or dispute submitted by Funders or Sellers, facilitates the timely resolution of the dispute between Funders, Owner, and Sellers. 3. In the event of a Collateral Level Deficit, Conduit Manager facilitates communications between Seller PBs, Sellers, and CA regarding remedies by Owner/Seller (margin calls, substitutions, partial repurchases). 4. In the event of a 'Failure to Cure', Conduit Manager coordinates model tie-out, and facilitates communication between Funders, Seller Prime Brokers ("PBs") Sellers, and CA regarding remedies by Funders (partial liquidations) 5. In the event of discretionary repurchases Owner's and/or Seller's Calls or substitutions by Sellers, Conduit Manager coordinates model tie-out, and facilitates communication between CA, Sellers, Seller PBs, and Funders. 6. In the event of 'Early Termination', Conduit Manager facilitates communication between CA, Sellers, and Funders regarding repurchases and orderly liquidation of Purchased Securities in the Collateral Account, and transfers of cash equivalents between accounts by custodian based on instructions in the GMRA, CU, and respective supporting Schedules.

Step S110: Early Termination: Generally, fifteen, twenty or twenty-five days. Upon Owner events of default, downgrade of Custodian Bank, 'Persistent Failure to Cure', and violation of early termination trigger due to extreme and/or persistent decline in the market value of the collateral account i.e., generally 35%, Conduit Manager will coordinate with CAA to facilitate the orderly liquidation procedures outlined in Schedules X, Y, Z.

Step S112: Stated Termination(Stated Repurchase Date'): Generally 1 day. On the Stated Repurchase Date (and during the pre-termination period leading up to the Stated Repurchase Date), Conduit Manager facilitates communication between CA, Funders, Seller PBs, and Sellers regarding the following termination procedures as outline in Schedules X, Y, Z: 1. Custodian collects advances due to repaid by Seller PBs to the Funders and directs the pro rate shares to the Funders' Accounts, amounts due to the Funders. 2. Upon verification by Funders' agents of full repayment of any and all amounts due, Funder releases its security interest in the Purchased Securities in the Collateral Account 3. Upon instructions from CA, Custodian releases remaining collateral to Sellers.

The following describes project specifications, in accordance with a preferred embodiment that include two example metrics to calculate portfolio risk.

Metric 1: Value at Risk ("VaR"). The VaR metric preferably uses the following inputs: (a) confidence interval ($\propto$); (b) the time horizon over which the portfolio would be held (T), (c) number of simulation runs (N) (d) number of paths/run of simulation (m=100 by default).

The output is the VaR, which is equal to the average estimate of the percentage drop in the value of the portfolio (from the initial value of the portfolio). The confidence level ($\propto$) is preferably used to read off the (m*$\propto$)th worst percentage drop in the value of the portfolio out of m paths in each simulation run. Thus in any particular simulation run, the portfolio value at the end of the time horizon (T) is computed over the m paths. These m paths are preferably sorted in an increasing order based on their portfolio returns. The (m*$\propto$)th return based on this sort is the VaR number for that particular simulation. This VaR number is preferably averaged over the N simulations to calculate the average VaR value. The standard errors of the VaR numbers obtained in each simulation are also preferably reported.

Metric 2: Threshold Persistence (TP). The TP metric uses the following inputs: (a) the time horizon over which the portfolio would be held (T); (b) threshold horizon (T'); (c) threshold level ($\beta$); (c) number of simulation runs (N) (d) number of paths/run of simulation (m=1000 by default).

The output is preferably (a) the percentage of times the value of the portfolio goes down (compared to the initial starting value) below the threshold level ($\beta$) and stays for T' days below this threshold level; and (b) the average drop in the value of the portfolio (compared to the initial starting value) conditional on (a) happening. For example, $\beta$=−5%, T'=2 days, T=10 days, m=10 and the starting value of the portfolio is $100. When the portfolio value is simulated, the following path is obtained: $102 (day 1), $98 (day 2), $94 (day 3), $90 (day 4), $94 (day 5), $96 (day 6), $98 (day 7), $90 (day 8), $95 (day 9) and $97 (day 10).

The relevant sequence here for computing (a) and (b) are the portfolio values from Day 3 to Day 5 since the portfolio value is less than $95 on each of these three days. The drop to $90 on day 8 does not count as a relevant event here since T'=2 and the portfolio value returned to the threshold level on Day 9, which is before the threshold window of 2 days expired. Further, suppose that in none of the other nine paths (since m=10) the event of crossing the threshold and staying below for the threshold horizon is triggered. In this case, the output is 1/10 for the percentage of paths for which the event is triggered. Further the drop, given the event occurring, is −10%. These is the output of one simulation run. These numbers are preferably averaged over the number of simulations runs.

The following describes in a preferred embodiment, Orthogonal Generalized Autoregressive Hetero Skedasticity ("garch") is employed for the methodology. Preferably, the steps that are performed are as follows.

1. Principal Components Analysis: A principal components analysis is performed on the returns of the securities comprising the portfolio. Those components which explain more than 80% (or 90%) of the variation are preferably retained. Choosing the principal components to retain in each particular portfolio preferably calls for judgment and is not currently programmed in. Generally when the model runs for other portfolios, judgment in retaining the principal components is preferably incorporated on a case-by-case basis. The program for generating the risk metrics detailed above preferably takes the number of principal components to be retained as an input. Preferably, a separate program operates to generate the principal components for each portfolio of securities and to show the cumulative percentage of variation that the principal components explain.

Continuing now with reference to the preferred methodology, 2. Garch fitting on each of the principal components, fitting of the conditional mean and the conditional variance, three choices are preferably made here.

Choice A. Auto Regressive Moving Average ("ARMA") process for the conditional mean. For simplicity and consistency with known procedures in the art, the order of the ARMA is restricted to be ARMA(1,1), as the most general. Thus, a choice between; i. the constant conditional mean which corresponds to ARMA(0,0); ii. an ARMA(1,0), which corresponds to a process with an AR component but no MA component; and iii. an ARMA(0,1), which corresponds to a process with no AR component but with an MA component, and iv. ARMA(1,1) which has both AR and MA components.

Again, the order of the ARMA process to be used for each principal component is preferably determined on a case-by-case basis based on an examination of the autocorrelation function (ACF) and partial autocorrelation function (PACF) of each principal component. Preferably, a separate software program operates to take the number of principal components retained as input, apart from the original time-series of returns on the securities in the portfolio and produce the ACF and PACF of these principal components.

The ACF and PACF are produced up to a maximum of 10 lags. The criteria for choosing between ARMA(0,0), ARMA (1,0), ARMA(0,1) and ARMA(1,1) are preferably as follows: i. if neither the ACF nor the PACF show any spikes at any of the lags, then the time series process resembles white noise and hence the constant conditional mean, or ARMA(0,0), is a suitable approximation for the conditional mean process of that principal component. ii. if the PACF declines exponentially then there is an AR component to the process while if he ACF declines exponentially when there is an MA component to the process. Thus, if the PACF declines exponentially while the ACF shows spikes at certain lags but does not decline exponentially, then that is indicative of an AR component to the process but no MA component, and ARMA(1,0) is chosen in this case. iii. If the ACF declines exponentially while the PACF shows spikes at certain lags but does not decline exponentially, then that is indicative of an MA component to the process but no AR component, and ARMA(0,1) is chosen in this case. iv. If the ACF and PACF both show persistent spikes at a large number of lags, then there is both an AR and an MA component to the time series, and ARMA(1,1) is chosen in this case.

Choice B. Incorporating the leverage effect in the conditional variance versus ignoring the leverage effect Choice C. Using the students-t distribution versus using the standard normal to take into account the fat tails 3. Monte Carlo simulation for the value of the portfolio based on the process fitted for the principal components. Here the loadings of each individual security on the principal components and the weights of each individual security in the portfolio is preferably used to simulate the portfolio values.

As will become evident to one skilled in the art and in accordance with the teachings herein, the present invention provides an improved mapping between state-dependent probabilities, decision paths, and values across counterparties. The systems and methods described herein address shortcomings in the prior art by employing contractual bargaining with agent-based computational methods for the dynamic allocation, optimization, and pricing contingent obligations between multiple counterparties. The processes preferably employ a hierarchy or tiering of binding incentive compatible contingent strategies which include optimal liquidation policy for matched assets and liabilities based upon stochastic volume/price schedule related to statistically non-stationary supply/demand elasticities and order-flow.

Although the present invention is described and shown in relation to particular embodiments thereof, many other variations and modifications and other uses will become apparent to those skilled in the art. It is preferred, therefore, that the present invention be limited not by the specific disclosure herein.

What is claimed is:

1. A method, the method comprising:
providing one or more processors operatively coupled to one or more processor readable media;
storing on the one or more processor readable media at least one database that includes:
electronic counterparty information representing a plurality of counterparties;
electronic control rights information representing respective rights to control inventory for at least two of the counterparties;
representing, by the one or more processors, each of the at least two counterparties by at least one respective agent;
observing, by at least one of the at least one respective agent for each of the at least two counterparties, at least one respective state;
mapping, by at least one of the at least one respective agent for each of the at least two counterparties, the at least one respective state to at least one probability of at least one conditional expectation formed in response to the at least one respective state;
mapping, by the at least one of the at least one respective agent for each of the at least two counterparties, the at least one conditional expectation to at least one decision formed in response to the at least one conditional expectation;
mapping, by the at least one of the at least one respective agent for each of the at least two counterparties, the at least one decision to at least one contingent payoff, and outputting the at least one contingent payoff.

2. The method of claim 1, wherein at least one of the mapping the at least one respective state, the mapping the at least one conditional expectation and the mapping the at least one decision includes one or more of estimation, forecasting, inference, simulation and optimization operations.

3. The method of claim 1, further comprising determining, by the one or more processors, an optimal outcome across all of the at least one respective agent as a function of the contingent payoff.

4. The method of claim 1, wherein the outputting is made to a manifold.

5. The method of claim 1, further comprising:
receiving, by the one or more processors, a notification that at least two of the plurality of counterparties exchange respective paths;
simulating, by the one or more processors, propagated states and paths for the at least two counterparties; and
accounting, by the one or more processors, for evolving contractual rights and duties among the plurality of parties as a function of the propagated states and paths.

6. The method of claim 5, wherein the accounting comprises one or more of orthogonal Garch methodologies and Poisson shot-noise methodologies for estimating time-series properties of volatility and correlation.

7. The method of claim 5, wherein the accounting comprises Bayesian dynamic tree and kernel-based machine learning methodologies for updating state-dependent and path-dependent conditional probabilities and utilities.

8. The method of claim 5, wherein the simulating comprises employing, by the one or more processors, evolutionary computational methods that include one or more of evolution strategies, evolutionary algorithms, Bayesian networks, and state machines.

9. The method of claim 1, further comprising updating by the at least one of the at least one respective agent for each of the at least two counterparties, the at least one conditional expectation as the at least one agent interacts in a state or with at least one other agent.

10. The method of claim 9, wherein the agents interact that include one or more of distributed searching, signaling, messaging, matching, and bargaining activities within a stochastic algorithmic game involving at least one agent.

11. A system, the system comprising:
one or more processors operatively coupled to one or more processor readable media;
at least one database stored on one or more of the one or more processor readable media, wherein the at least one database includes:
electronic counterparty information representing a plurality of counterparties;
electronic control rights information representing respective rights to control inventory for at least two of the counterparties;
wherein the one or more processors is programmed and configured to:
represent each of the at least two counterparties by at least one respective agent;
observe, by at least one of the at least one respective agent for each of the at least two counterparties, at least one respective state;
map, by at least one of the at least one respective agent for each of the at least two counterparties, the at least one respective state to at least one probability of at least one conditional expectation formed in response to the at least one respective state;
map, by the at least one of the at least one respective agent for each of the at least two counterparties, the at least one conditional expectation to at least one decision formed in response to the at least one conditional expectation;
map, by the at least one of the at least one respective agent for each of the at least two counterparties, the at least one decision to at least one contingent payoff, and
output the at least one contingent payoff.

12. The system of claim 11, wherein at least one of the mapping the at least one respective state, the mapping the at least one conditional expectation and the mapping the at least one decision includes one or more of estimation, forecasting, inference, simulation and optimization operations.

13. The system of claim 11, wherein the one or more processors is further programmed and configured to determine an optimal outcome across all of the at least one respective agent as a function of the contingent payoff.

14. The system of claim 11, wherein the outputting is made to a manifold.

15. The system of claim 11, wherein the one or more processors is further programmed and configured to:
receive a notification that at least two of the plurality of counterparties exchange respective paths;
simulate propagated states and paths for the at least two counterparties; and
account for evolving contractual rights and duties among the plurality of parties as a function of the propagated states and paths.

16. The system of claim 15, wherein the accounting comprises one or more of orthogonal Garch methodologies and Poisson shot-noise methodologies for estimating time-series properties of volatility and correlation.

17. The system of claim 15, wherein the accounting comprises Bayesian dynamic tree and kernel-based machine learning methodologies for updating state-dependent and path-dependent conditional probabilities and utilities.

18. The system of claim 15, wherein the one or more processors is further programmed and configured to employ evolutionary computational methods that include one or more of evolution strategies, evolutionary algorithms, Bayesian networks, and state machines.

19. The system of claim 11, wherein the one or more processors is further programmed and configured to update, by the at least one of the at least one respective agent for each of the at least two counterparties, the at least one conditional expectation as the at least one agent interacts in a state or with at least one other agent.

20. The system of claim 19, wherein the agents interact that include one or more of distributed searching, signaling, messaging, matching, and bargaining activities within a stochastic algorithmic game involving at least one agent.

* * * * *